(12) United States Patent
Hirota et al.

(10) Patent No.: US 6,370,869 B1
(45) Date of Patent: Apr. 16, 2002

(54) EXHAUST PURIFICATION DEVICE OF AN ENGINE

(75) Inventors: Shinya Hirota; Takamitsu Asanuma; Shunsuke Toshioka, all of Susono; Toshiaki Tanaka, Numazu, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/627,991

(22) Filed: Jul. 28, 2000

(30) Foreign Application Priority Data

Jul. 28, 1999 (JP) .......................................... 11-214239

(51) Int. Cl.[7] ................................................. F01N 3/00
(52) U.S. Cl. ............................. 60/276; 60/284; 60/285; 60/292
(58) Field of Search ..................... 60/276, 277, 284, 60/285, 286, 292, 324, 305, 300

(56) References Cited

U.S. PATENT DOCUMENTS

| | | | | |
|---|---|---|---|---|
| 5,233,831 A | * | 8/1993 | Hitomi et al. ................. | 60/284 |
| 5,845,486 A | * | 12/1998 | Yamashita et al. ............. | 60/274 |
| 5,934,072 A | * | 8/1999 | Hirota et al. .................. | 60/301 |
| 5,970,707 A | * | 10/1999 | Sawada et al. ................. | 60/277 |
| 6,119,452 A | * | 9/2000 | Kinugasa et al. .............. | 60/285 |
| 6,192,675 B1 | * | 2/2001 | Hirota et al. .................. | 60/286 |

FOREIGN PATENT DOCUMENTS

| | | |
|---|---|---|
| JP | 49-80414 | 8/1974 |
| JP | 6-50132 | 2/1994 |
| JP | 6-93902 | 5/1994 |
| JP | 8-100638 | 4/1996 |
| JP | 8-303290 | 11/1996 |
| JP | 10-212995 | 8/1998 |
| JP | 10-238336 | 9/1998 |

* cited by examiner

Primary Examiner—Thomas Denion
Assistant Examiner—Binh Tran
(74) Attorney, Agent, or Firm—Kenyon & Kenyon

(57) ABSTRACT

An exhaust purification device comprising a first catalyst and a second catalyst arranged in the engine exhaust passage downstream of the first catalyst. An exhaust control valve is arranged downstream of the second catalyst. When the reducing components in the exhaust gas should be mainly oxidized by the first catalyst, the exhaust control valve is substantially fully closed and auxiliary fuel is additionally injected into the combustion chamber. When the reducing components in the exhaust gas should be mainly oxidized by the second catalyst, the exhaust control valve is fully opened and injection of auxiliary fuel is stopped.

17 Claims, 14 Drawing Sheets

Fig.6A
PORT OUTLET·
LOW LOAD
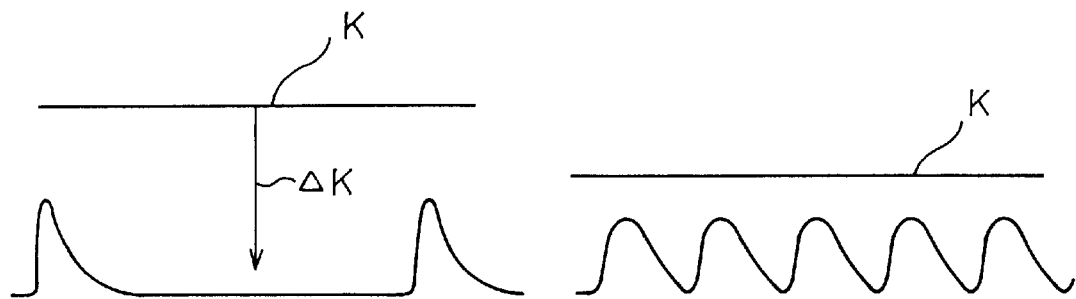
Fig.6C
SECOND CATALYST·
LOW LOAD
Fig.6B
PORT OUTLET·
HEAVY LOAD
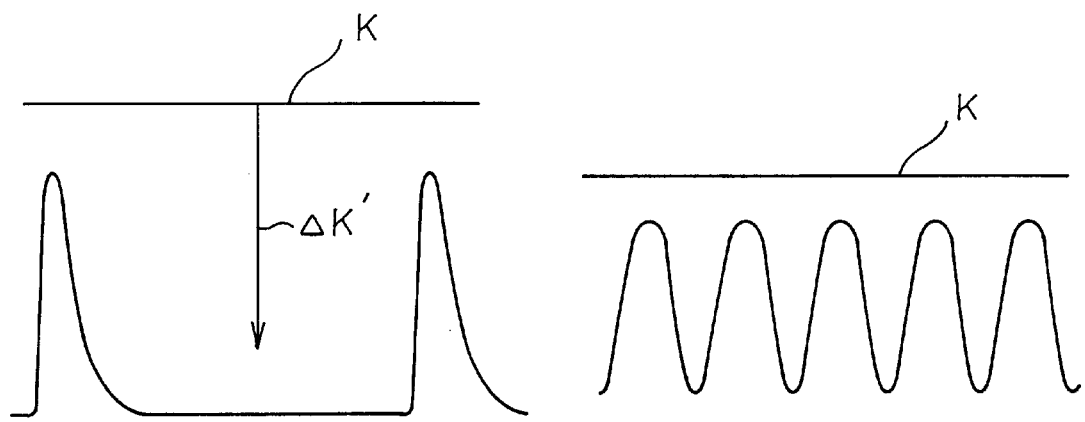
Fig.6D
SECOND CATALYST·
HEAVY LOAD

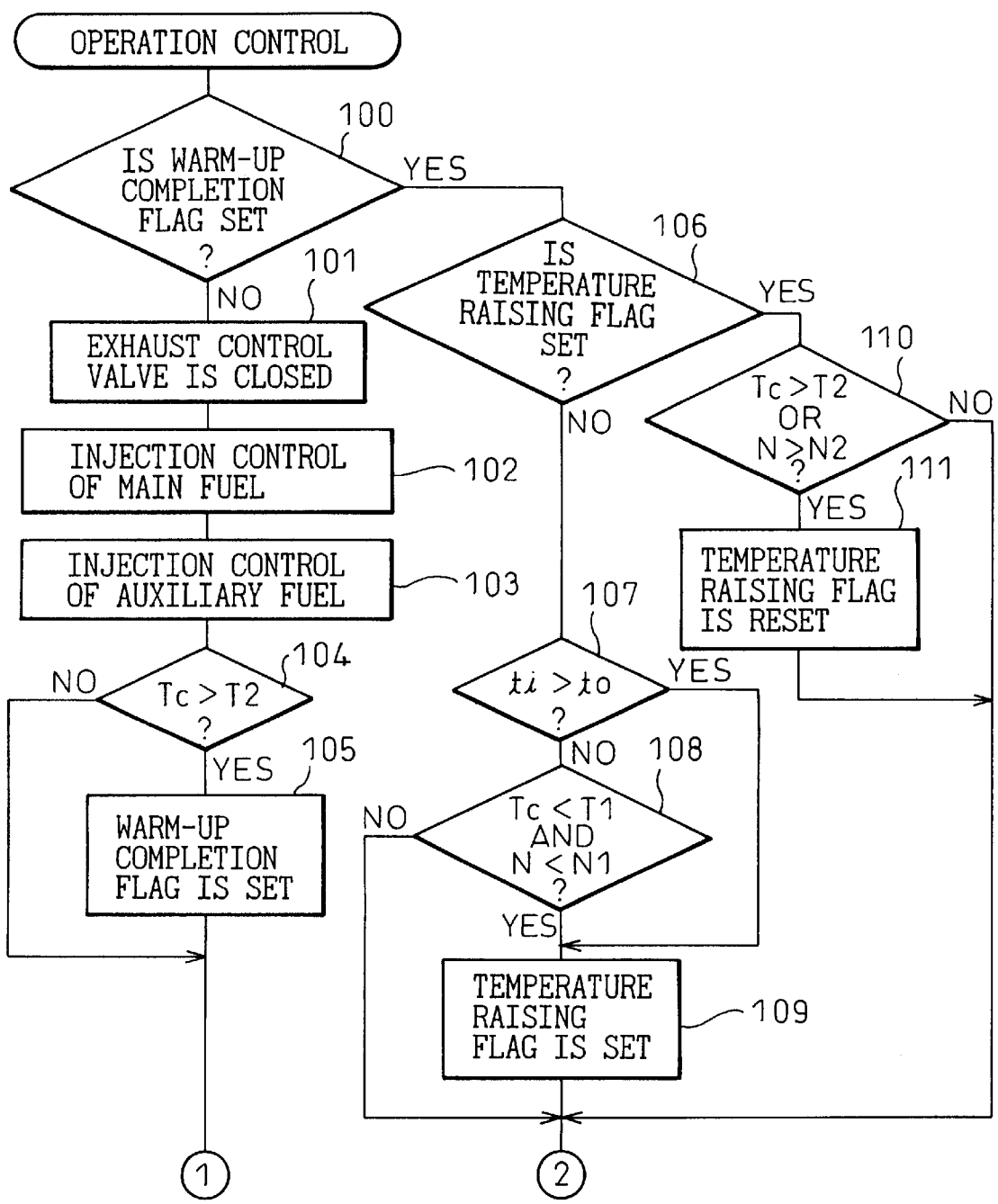

EXHAUST PURIFICATION DEVICE OF AN ENGINE

BACKGROUND OF THE INVENTION

1. Field of the Invention

The present invention relates to an exhaust purification device of an engine.

2. Description of the Related Art

Known in the art is an internal combustion engine having a first catalyst arranged in an exhaust manifold of the engine and having a second catalyst arranged in an engine exhaust passage downstream of the first catalyst (see Japanese Unexamined Patent Publication (Kokai) No. 6-93902). By arranging the first catalyst in the exhaust manifold in this way, the first catalyst is activated at a relatively early timing after engine start-up and therefore the exhaust gas can be purified from a relatively early timing after engine start-up. In this case, it is preferable to have the first catalyst activated at an even earlier timing so as to purify the exhaust gas at a further earlier timing after engine start-up. Therefore, in this internal combustion engine, for a while after engine start-up, the fuel injection timing is delayed and the ignition timing delayed so as to raise the exhaust gas temperature and thereby enable the first catalyst to be activated as early as possible.

Once the first catalyst is activated, however, it remains activated while the engine is operating. Therefore, the considerable amount of reducing components in exhaust gas such as unburned hydrocarbons or carbon monoxide is made to oxidize by the first catalyst at all times. In other words, the amount of reducing components in the exhaust gas flowing to the second catalyst does not become that large. This may appear to be preferable when seen from the viewpoint of purification of the exhaust gas. In actuality, however, the second catalyst sometimes requires a large amount of reducing components. In such a case, the problem arises that a sufficient amount of reducing components cannot be supplied to the second catalyst.

For example, since the second catalyst is arranged downstream of the first catalyst, it is lower in temperature than the first catalyst and therefore, unlike the first catalyst, tends to become deactivated in state even if once activated. Preventing the second catalyst from becoming deactivated in state requires that the second catalyst be heated. The most suitable method for heating the second catalyst is to have the reducing components of the exhaust gas such as unburned hydrocarbons or carbon monoxide be oxidized on the second catalyst and thereby cause the generation of heat of oxidation reaction in the second catalyst. Therefore, the exhaust gas flowing into the second catalyst must contain a large amount of reducing components.

Accordingly, if a considerable portion of the reducing components in exhaust gas is constantly being oxidized by the first catalyst and therefore the amount of the reducing components in the exhaust gas flowing into the second catalyst no longer becomes that large as in the case of the above internal combustion engine, the second catalyst easily becomes deactivated in state. If the second catalyst becomes deactivated in state, a considerable amount of reducing components such as unburned hydrocarbons or carbon monoxide is released into the atmosphere. That is, the problem arises that if the first catalyst is provided upstream of the second catalyst, the amount of unburned hydrocarbons and carbon monoxide exhausted into the atmosphere conversely ends up increasing. Therefore, when the second catalyst requires a large amount of reducing components, the amount of reducing components made to oxidize by the first catalyst has to be reduced.

SUMMARY OF THE INVENTION

An object of the present invention is to provide an exhaust purification device of an engine which is capable of effectively reducing an amount of unburned hydrocarbons and carbon monoxide discharged to the outside air.

According to the present invention, there is provided an exhaust purification device of an engine having an exhaust passage, comprising a first catalyst arranged in the exhaust passage; a second catalyst arranged in the exhaust passage downstream of the first catalyst; judging means for judging if the engine is in an operating state where reducing components in an exhaust gas should mainly be made to oxidize by the first catalyst or if the engine is in an operating state where reducing components in the exhaust gas should mainly be made to oxidize by the second catalyst; and oxidation ratio controlling means for making a ratio of oxidation of reducing components in the exhaust gas at the first catalyst increase when it is judged that the engine is in an operating state where reducing components in the exhaust gas should mainly be made to oxidize by the first catalyst and for making the ratio of oxidation of reducing components in the exhaust gas at the first catalyst decrease when it is judged that the engine is in an operating state where reducing components in the exhaust gas should mainly be made to oxidize by the second catalyst.

BRIEF DESCRIPTION OF THE DRAWINGS

The present invention will be more fully understood from the description of preferred embodiments of the invention set forth below, together with the accompanying drawings, in which:

FIGS. 6A, 6B, 6C, and 6D are views of changes in the flow rate of exhaust gas;

FIGS. 16A and 16B are flow charts of the control of operation.

DESCRIPTION OF THE PREFERRED EMBODIMENTS

Figure 1:
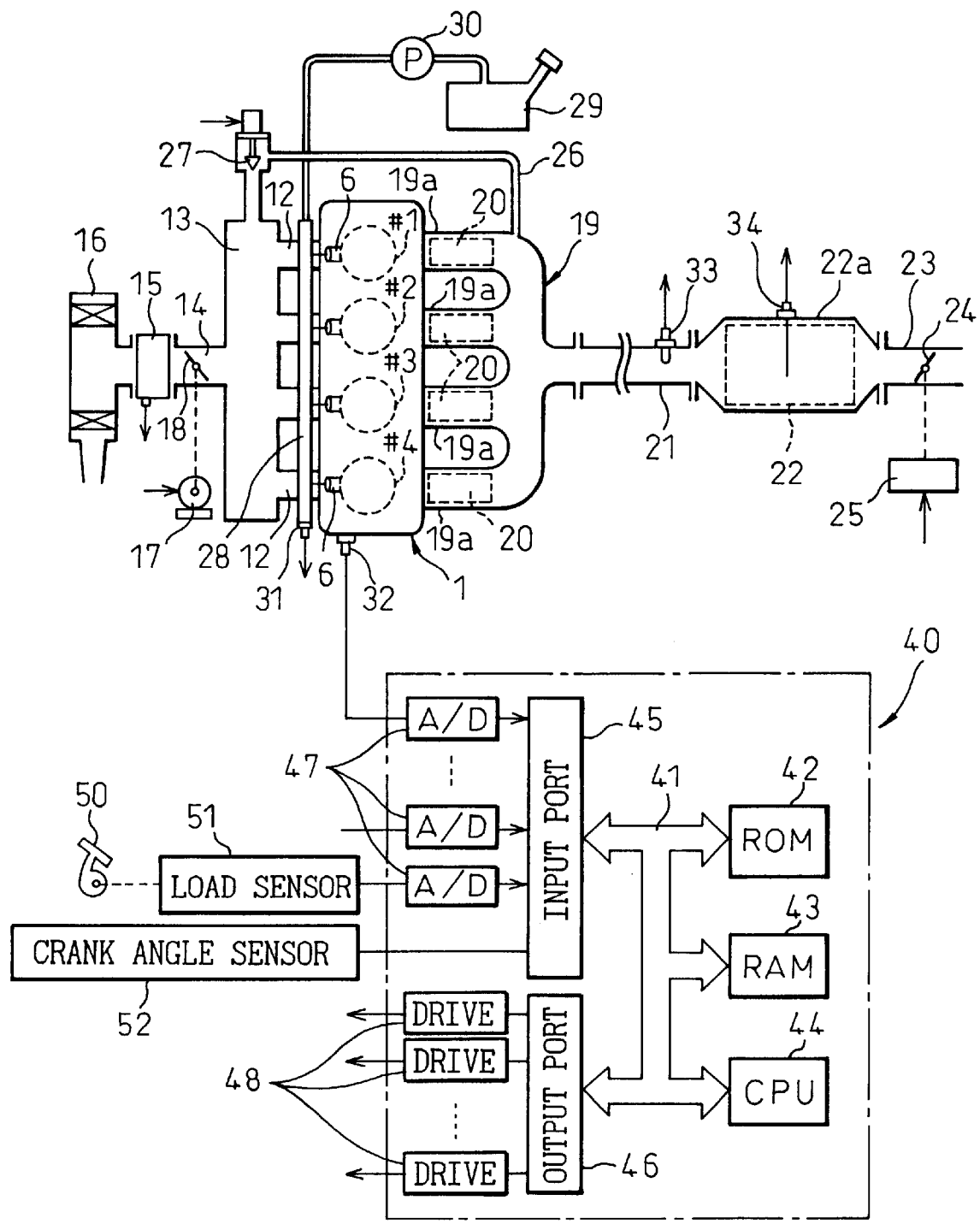
FIG. 1 is an overview of an internal combustion engine.
Figure 2:
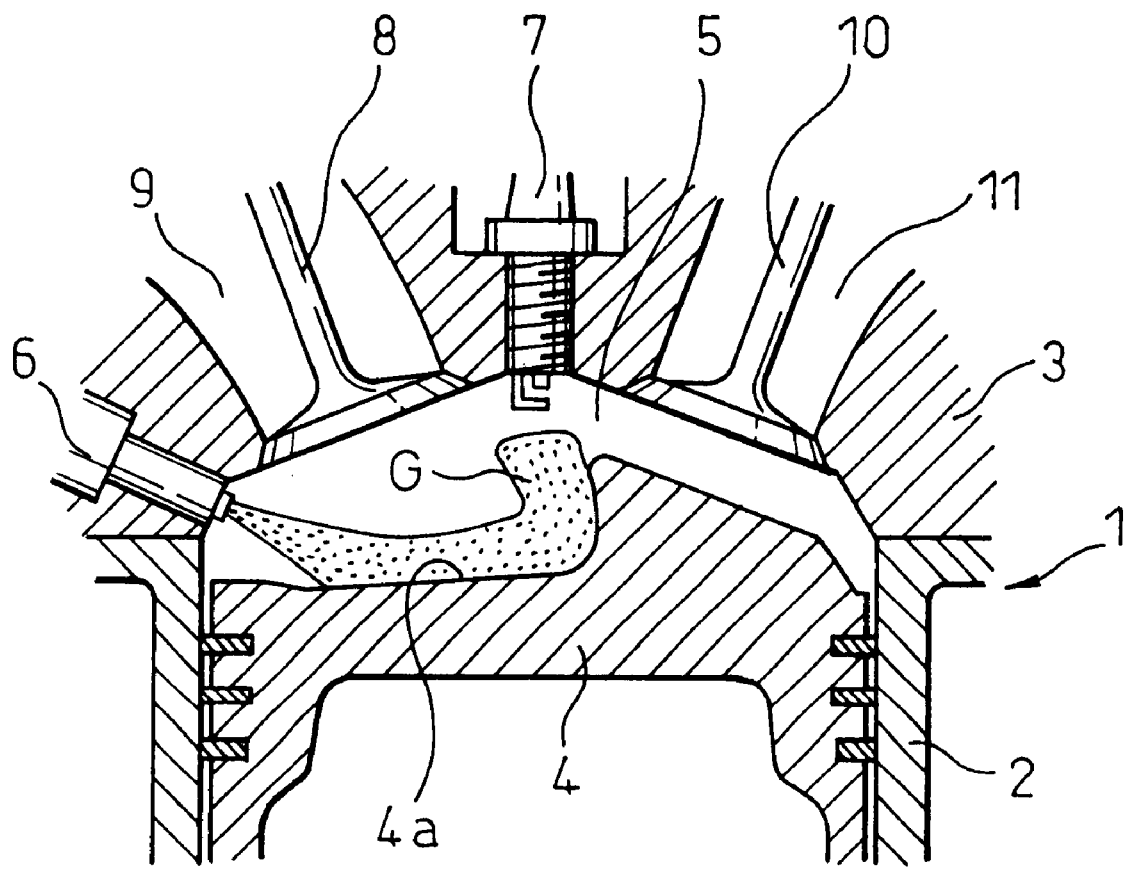
FIG. 2 is a side sectional view of a combustion chamber.

FIG. 1 and FIG. 2 show cases of application of the present invention to a stratified combustion type internal combustion engine. The present invention, however, may also be applied to a spark ignition type internal combustion engine where combustion is performed under a uniform lean air-fuel ratio and a diesel engine where combustion is performed under excess air.

Referring to FIG. 1, 1 shows an engine body. The engine body 1 has four cylinders, that is, a no. 1 cylinder #1, no. 2 cylinder #2, no. 3 cylinder #3, and no. 4 cylinder #4. FIG. 2 is a side sectional view of the cylinders #1, #2, #3, and #4. Referring to FIG. 2, 2 is a cylinder block, 3 a cylinder head, 4 a piston, 5 a combustion chamber, 6 a fuel injector arranged at a peripheral edge of an inner wall of the cylinder head 3, 7 a spark plug arranged at a center of an inner wall of the cylinder head 3, 8 an intake valve, 9 an intake port, 10 an exhaust valve, and 11 an exhaust port.

Referring to FIG. 1 and FIG. 2, the intake port 9 is connected through a corresponding intake pipe 12 to a surge tank 13. The surge tank 13 is connected through an intake duct 14 and air flow meter 15 to an air cleaner 16. A throttle valve 18 driven by a step motor 17 is arranged in the intake duct 14. On the other hand, the exhaust port 11 of each of the cylinders #1, #2, #3, and #4 is connected to a corresponding branch pipe 19a of the exhaust manifold 19. In the exhaust branch passage formed in each pipe 19a is arranged the first catalyst 20. The exhaust manifold 19 is connected through the exhaust pipe 21 to a catalytic converter 22a housing the second catalyst 22. An exhaust pipe 23 is connected to the catalytic converter 22a. In the exhaust pipe 23 is arranged an exhaust control valve 24 controlled by an actuator 25.

The exhaust manifold 19 and the surge tank 13 are connected to each other through an exhaust gas recirculation (EGR) passage 26 as shown in FIG. 1. An electrically controlled EGR control valve 27 is arranged in the EGR passage 26. Each fuel injector 6 is connected through a fuel supply line 26 to a common fuel reservoir, that is, a so-called common rail 28. Fuel in a fuel tank 29 is supplied into this common rail 28 via an electronically controlled variable discharge fuel pump 30. The fuel supplied into the common rail 28 is supplied to the fuel injectors 6. The common rail 28 has mounted in it a fuel pressure sensor 31 for detecting the fuel pressure in the common rail 28. The amount of discharge of the fuel pump 30 is controlled based on the output signal of the fuel pressure sensor 31 so that the fuel pressure in the common rail 28 becomes a target fuel pressure.

The electronic control unit 40 is comprised of a digital computer and is provided with a read only memory (ROM) 42, a random access memory (RAM) 43, a microprocessor (CPU) 44, an input port 45, and an output port 46 connected with each other by a bidirectional bus 41. The air flow meter 15 generates an output voltage proportional to the amount of intake air. The output voltage is input through a corresponding AD converter 47 to the input port 45. The engine body 1 is provided with a water temperature sensor 32 for detecting the temperature of the cooling water of the engine. The output signal of the water temperature sensor 32 is input through the corresponding AD converter 47 to the input port 45. Further, the input port 45 receives as input the output signal of a fuel pressure sensor 31 through a corresponding AD converter 47.

Further, inside the exhaust pipe 21 is arranged a pressure sensor 33 for detecting the pressure of the exhaust gas inside the exhaust manifold 19 and exhaust pipe 21, that is, the back pressure. The output signal of the pressure sensor 33 is input through the corresponding AD converter 47 to the input port 45. The catalytic converter 22a is provided with a temperature sensor 34 for detecting the temperature of the catalyst 22. The output signal of the temperature sensor 34 is input through the corresponding AD converter 47 to the input port 45.

Further, the accelerator pedal 50 has connected to it a load sensor 51 for generating an output voltage proportional to the amount of depression of the accelerator pedal 50. The output voltage of the load sensor 51 is input through a corresponding AD converter 47 to the input port 45. Further, the input port 45 has connected to it a crank angle sensor 52 for generating an output pulse every time the crank shaft rotates by for example 30 degrees. On the other hand, the output port 46 has connected to it through corresponding drive circuits 48 the fuel injectors 6, spark plugs 7, throttle valve control step motor 17, exhaust control valve control actuator 25, EGR control valve 27, and fuel pump 30.

Figure 3:
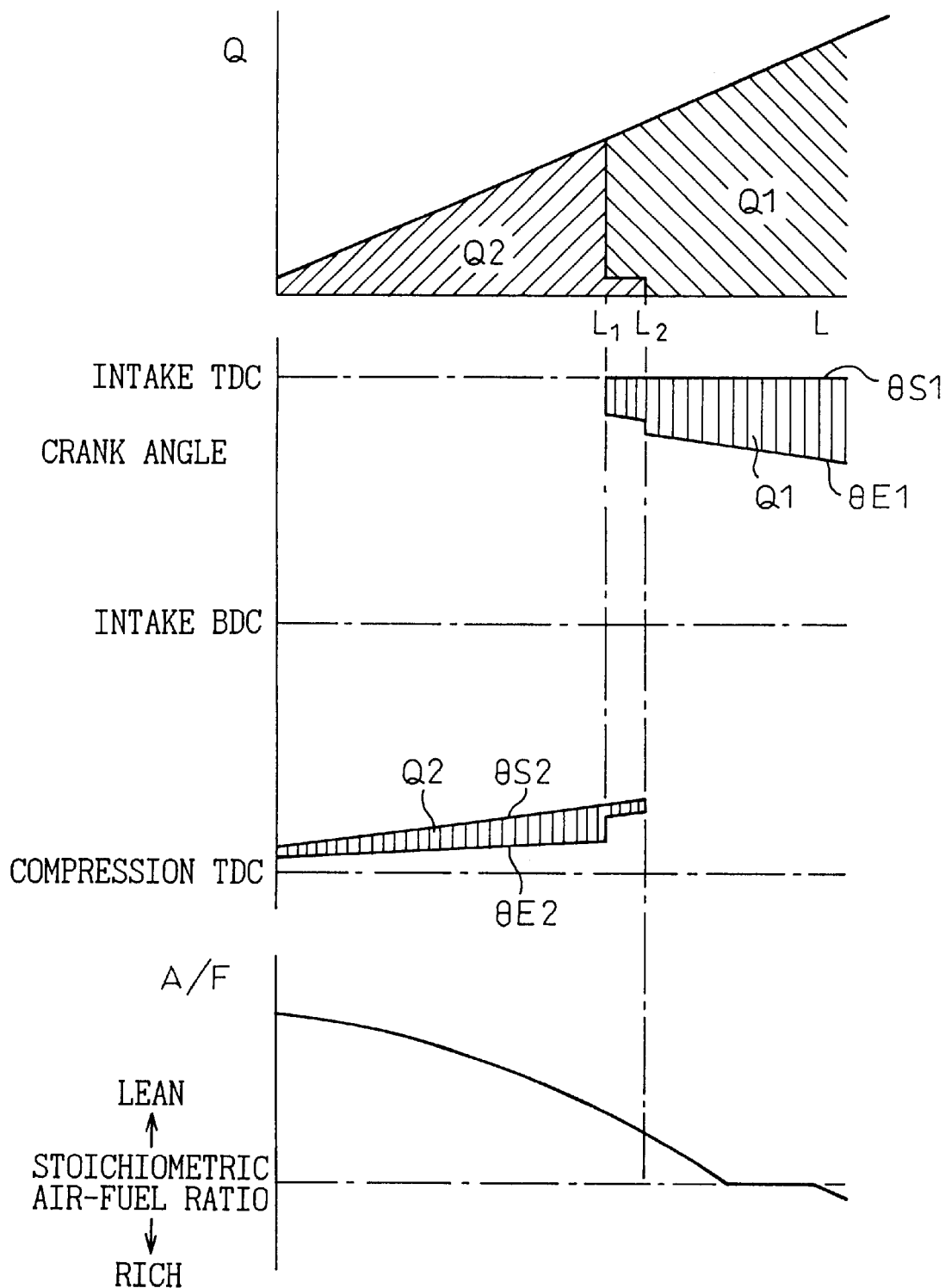
FIG. 3 is a view of the injection amount, injection timing, and air-fuel ratio.

FIG. 3 shows the fuel injection amounts Q1, Q2, and Q (=Q1+Q2), the injection start timings $\theta S1$ and $\theta S2$, the injection end timings $\theta E1$ and $\theta E2$, and the average air-fuel ratio A/F in the combustion chamber 5. Note that in FIG. 3, the abscissa L shows the amount of depression of the accelerator pedal 50, that is, the required load.

As will be understood from FIG. 3, when the required load L is lower than $L_1$, fuel injection Q2 is performed from $\theta S2$ to $\theta E2$ of the end of the compression stroke. When the required load L is between $L_1$ and $L_2$, first fuel injection Q1 is performed from $\theta S1$ to $\theta E1$ of the start of the intake stroke, then second fuel injection Q2 is performed from $\theta S2$ to $\theta E2$ of the end of the compression stroke. At this time as well, the air-fuel ratio A/F becomes lean. When the required load is larger than even $L_2$, the fuel injection Q1 is performed from the $\theta S1$ to $\theta E1$ of the start of the intake stroke. At this time, in the region with the lower required load, the average air-fuel ratio A/F is made lean. If the required load L becomes higher, the air-fuel ratio is made the stoichiometric air-fuel ratio, while if the required load L becomes further higher, the average air-fuel ratio A/F is made rich. Note that the operating region where the fuel injection Q2 is performed only at the end of the compression stroke, the operating region where the fuel injection Q1 and Q2 are performed twice, and the region where the fuel injection Q1 is performed only at the start of the intake stroke are not determined solely by the required load L, but are actually determined by the required load L and the engine speed.

FIG. 2 shows the case when the required load L is smaller than $L_1$ (FIG. 3), that is, where the fuel injection Q2 is performed only at the end of the compression stroke. As shown in FIG. 2, a cavity 4a is formed on the top surface of a piston 4. When the required load L is lower than $L_1$, fuel is injected from the fuel injector 6 to the bottom wall surface of the cavity 4a at the end of the compression stroke. This fuel is guided by the peripheral wall surface of the cavity 4a and heads toward the spark plug 7, whereby an air-fuel mixture G is formed around the spark plug 7. Next, this air-fuel mixture G is ignited by the spark plug 7.

On the other hand, as explained above, when the required load is between $L_1$ and $L_2$, the fuel is injected divided into two injections. In this case, a lean air-fuel mixture is formed in the combustion chamber 5 by the first fuel injection Q1 performed at the start of the intake stroke. Next, an air-fuel mixture of an optimal concentration is formed around the spark plug 7 by the second fuel injection Q2 performed at the end of the compression stroke. This air-fuel mixture is ignited by the spark plug. The flame of ignition causes the lean air-fuel mixture to burn.

On the other hand, when the required load L is larger than $L_2$, as shown in FIG. 3, a homogeneous air-fuel mixture of a lean or stoichiometric air-fuel ratio or rich air-fuel ratio is formed in the combustion chamber 5. This homogeneous air-fuel mixture is ignited by the spark plug 7.

Next, an explanation will be made of various embodiments relating to the arrangement of the first catalyst 20.

Figure 4A:
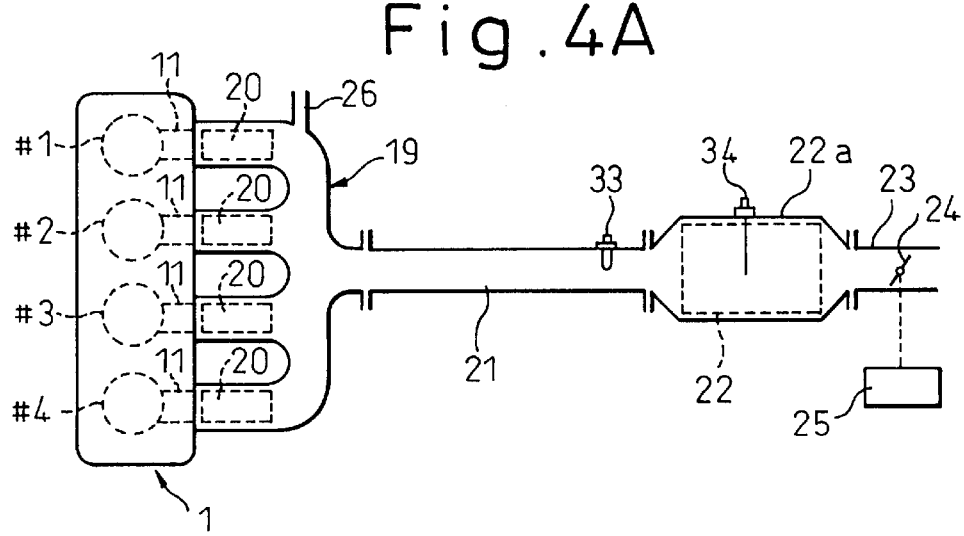
FIGS. 4A, 4B, and 4C are views of various embodiments relating to the arrangement of a first catalyst.

FIG. 4A shows the embodiment shown in FIG. 1.

Figure 4B:
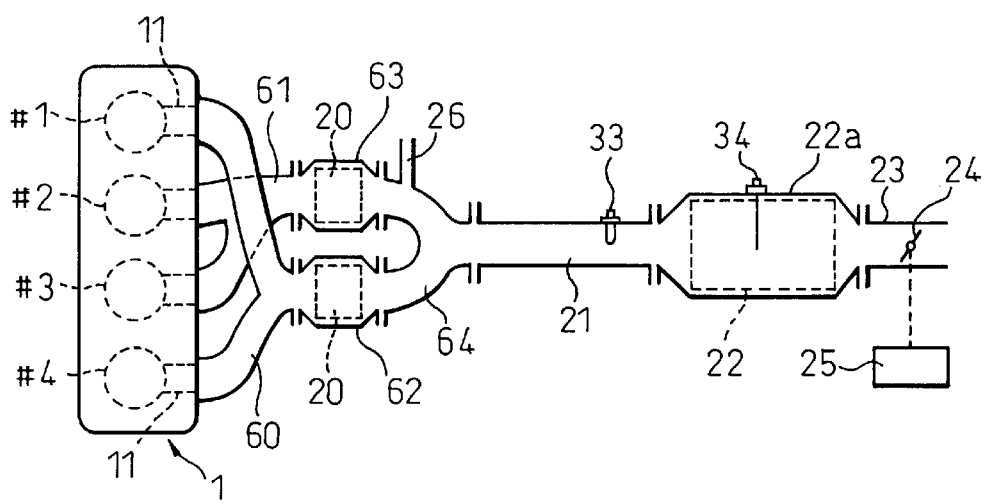

In the embodiment shown in FIG. 4B, the ignition sequence is made 1-3-4-2. As shown in FIG. 4B, the exhaust ports 11 of every other cylinders #1 and #4 of the ignition sequence are connected to a common first exhaust manifold 60, while the exhaust ports 11 of the remaining every other cylinders #2 and #3 of the ignition sequence are connected to a common second exhaust manifold 61. The collecting portion of the first exhaust manifold 60, that is, the common exhaust tube passage for the pair of cylinders #1 and #4, is connected to a first catalytic converter 62 accommodating the first catalyst 20, while the collecting portion of the second exhaust manifold 61, that is, the common exhaust tube passage for the pair of cylinders #2 and #3, is connected to a second catalytic converter 63 accommodating the first catalyst 20. The first catalytic converter 62 and the second catalytic converter 63 are connected through the common exhaust pipe 64 to the exhaust pipe 21.

Figure 4C:
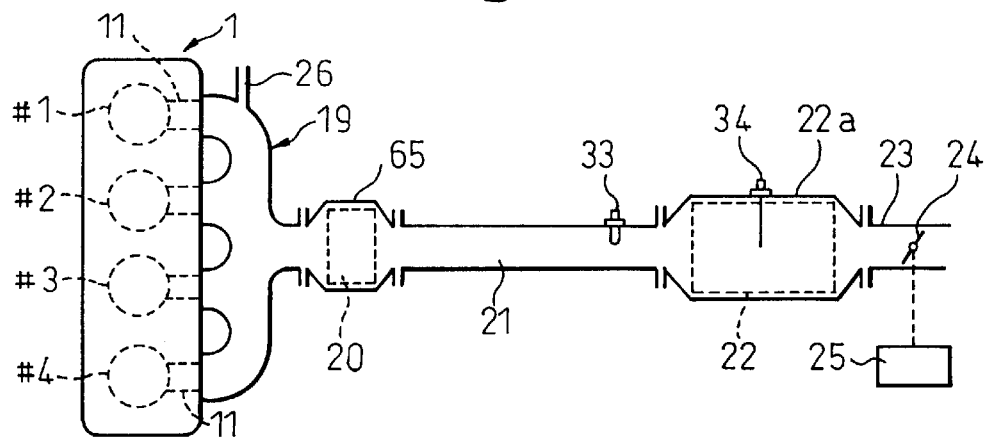

In the embodiment shown in FIG. 4C, a catalytic converter 65 accommodating the first catalyst 20 is connected to the outlet of the exhaust manifold 19 common to all cylinders #1, #2, #3, and #4. The catalytic converter 65 is connected to the exhaust pipe 21.

As the first catalyst 20, an oxidation catalyst or three-way catalyst is used. As the second catalyst 22, an oxidation catalyst, three-way catalyst, or NOx absorbent is used. An NOx absorbent functions to absorb NOx when the average air-fuel ratio in the combustion chamber 5 is lean and release the NOx when the average air-fuel ratio in the combustion chamber 5 becomes rich.

The NOx absorbent is comprised of for example alumina as a carrier and, carried on that carrier, for example, at least one element selected from potassium K, sodium Na, lithium Li, cesium Cs, and other alkali metals, barium Ba, calcium Ca, and other alkali earths, and lanthanum La, yttrium Y, and other rare earths plus a rare metal such as platinum Pt.

Figure 5:
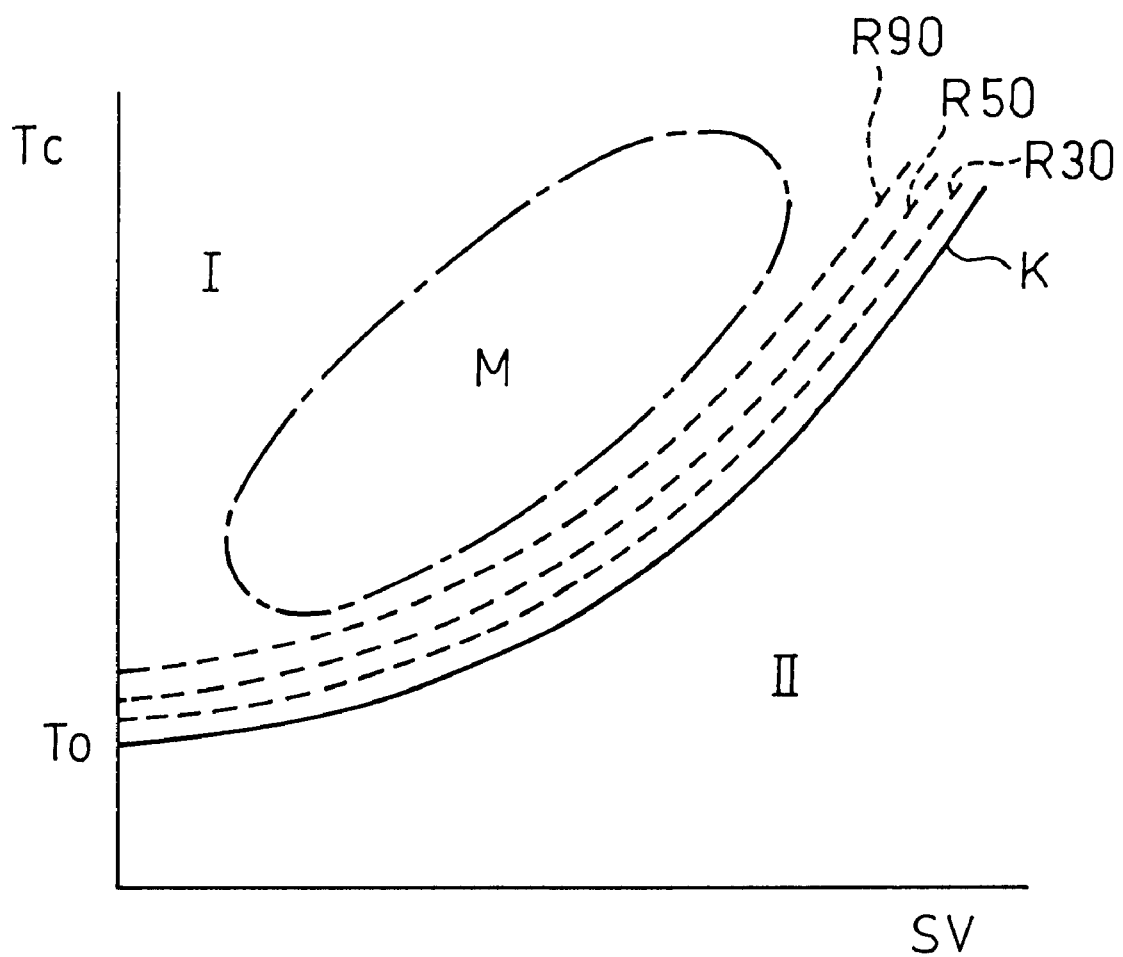
FIG. 5 is a view of a catalytic reaction activation region.

FIG. 5 shows the state of activation of the catalytic reaction of the second catalyst 22 shown from FIG. 4A to FIG. 4C. Note that in FIG. 5, the ordinate Tc shows the temperature of the second catalyst 22, while the abscissa SV shows the space velocity (=the volume flow rate of the exhaust gas per unit time/the volume of the catalyst). Further, $T_0$ shows the activation temperature of the second catalyst 22. The curve K shows the catalytic reaction activation limit where the catalytic reaction of the second catalyst 22 is activated. That is, the region I above the catalytic reaction activation limit K shows the catalytic reaction activation region where the catalytic reaction is activated, while the region II below the catalytic reaction activation limit K shows the catalytic reaction deactivation region where there is no catalytic reaction. Further, R30, R50, and R90 show the cases of purification rates of the reducing components in the exhaust gas by the second catalyst 22 of 30%, 50%, and 90%.

An increase in the space velocity SV means that the flow rate of the exhaust gas through the second catalyst 22 becomes faster. Therefore, the higher the space velocity SV, the shorter the contact time of the exhaust gas with the second catalyst 22. On the other hand, the second catalyst 22 is activated regardless of the space velocity SV when the activation temperature $T_0$ is reached. Even if the second catalyst 22 reaches the activation temperature $T_0$ however, if the space velocity SV becomes higher, the contact time of the exhaust gas with the second catalyst 22 becomes shorter, so there is no longer any catalistic reaction. In this case, if the temperature Tc of the second catalyst rises, a catalistic reaction occurs. Therefore, the catalytic reaction activation limit K becomes as shown in FIG. 5.

On the other hand, the higher the temperature Tc of the second catalyst 22 with respect to the catalytic reaction activation limit K, the more active the catalytic reaction. Therefore, the higher the temperature Tc of the second catalyst 22, the higher the purification rate of the reducing components in the exhaust gas. Therefore, the purification rates R30, R50, and R90 of the reducing components in the exhaust gas become as shown in FIG. 5.

As will be understood from FIG. 5, however, even in an operating state with a low exhaust gas temperature, that is, even when the temperature Tc of the second catalyst 22 is low, it is necessary to make the space velocity SV of the exhaust gas flowing through the second catalyst 22 small so as to maintain the second catalyst 22 inside the catalyst reaction activation region I. Therefore, it is necessary to make the second catalyst 22 larger. If the second catalyst 22 is made larger, however, it becomes difficult to arrange the second catalyst 22 in the engine compartment and therefore the second catalyst 22 has to be arranged under the floor of the vehicle away from the engine. If the second catalyst 22 is arranged at a position away from the engine, however, the temperature of the exhaust gas flowing through the second catalyst 22 becomes low and as a result it is difficult to maintain the second catalyst 22 inside the catalytic reaction activation region I.

In this case, it is necessary to raise the temperature Tc of the second catalyst 22 to maintain the second catalyst 22 in the catalytic reaction activation region I. Therefore, the most suitable method is to cause the reducing components in the exhaust gas to oxidize at the second catalyst 22 and use the heat of oxidation reaction generated at that time to maintain the second catalyst 22 at a high temperature.

On the other hand, for a little while after engine start-up, the temperature Tc of the second catalyst 22 is considerably low. At this time, no oxidizing action of the reducing components in the exhaust gas by the second catalyst 22 can be expected. Therefore, in the embodiments of the present invention, as shown in FIGS. 4A to 4C, the first catalyst 20 is arranged near the engine and the reducing components in the exhaust gas such as unburned hydrocarbons and carbon monoxide are made to be oxidized by the first catalyst 20 for a while after engine start-up.

If the reducing components in the exhaust gas continue to be oxidized at the first catalyst 20 during operation of the engine, however, the amount of the reducing components in the exhaust gas flowing into the second catalyst 22 falls and as a result a sufficient heat of oxidation reaction can no longer be generated at the second catalyst 22, so maintaining the second catalyst 22 in the catalytic reaction activation region I becomes difficult. That is, when the second catalyst 22 requires a large amount of reducing components, the action of the first catalyst 22 in oxidizing the reducing components has to be suppressed.

Further, when using an NOx absorbent as the second catalyst 22 as explained above, when NOx should be released from the NOx absorbent, the air-fuel ratio in the combustion chamber 5 is made rich and a large amount of unburned hydrocarbons and carbon monoxide, that is, a large amount of reducing components, is exhausted from the combustion chamber 5. In this case, if the large amount of reducing components is made to be oxidized by the first catalyst 20, NOx can no longer be released from the NOx absorbent. That is, in this case as well, when the second catalyst 22 requires a large amount of reducing components, the action of the first catalyst 20 in oxidizing the reducing components has to be suppressed.

Therefore, in the present invention, when the reducing components in the exhaust gas are made to be mainly oxidized by the first catalyst 20, the ratio of oxidation of the reducing components in the exhaust gas in the first catalyst 20 is increased, while when the reducing components in the exhaust gas are made to be mainly oxidized by the second catalyst 22, the ratio of oxidation of the reducing components in the exhaust gas in the first catalyst 20 is decreased.

Next, this will be explained taking as an example the case of use of a first catalyst 20 having an activation temperature $T_0$ substantially the same as the second catalyst 22 and while referring to FIGS. 6A to 6D and FIGS. 7A and 7B.

FIG. 6A shows the change in the flow rate of exhaust gas near the outlet of the exhaust port 11 at the time of engine low load operation, while FIG. 6B shows the change in the flow rate of exhaust gas near the outlet of the exhaust port 11 at the time of engine heavy load operation. Further, FIG. 6C shows the change in the flow rate of exhaust gas in the second catalyst 22 at the time of engine low load operation, while FIG. 6D shows the change in the flow rate of exhaust gas in the second catalyst 22 at the time of engine heavy load operation.

When the exhaust valve 10 opens, the exhaust gas is ejected all at once from the combustion chamber 5 to the inside of the exhaust port 11. Therefore, as shown in FIGS. 6A and 6B, the flow rate of the exhaust gas near the outlet of the exhaust port 11 becomes high for a while every time the exhaust valve 10 is opened. In this case, the higher the engine load, the higher the pressure of the burned gas in the combustion chamber 5, so the flow rate of the exhaust gas near the outlet of the exhaust port 11 becomes considerably faster at the time of the heavy load operation shown in FIG. 6B than the time of low load operation shown in FIG. 6A. On the other hand, the peak value of the exhaust gas becomes gradually lower while flowing in the exhaust passage. Further, the exhaust gas flowing out from the exhaust ports 11 converge and flow into the second catalyst 22, so the flow rate of the exhaust gas in the second catalyst 22 becomes as shown in FIGS. 6C and 6D.

On the other hand, at FIGS. 6C and 6D, K shows the catalytic reaction activation limit shown in FIG. 5. If the flow rate of the exhaust gas becomes higher than this catalytic reaction activation limit K, the catalytic reaction deactivation region II shown in FIG. 5 is reached, therefore the action of the second catalyst 22 in oxidizing the reducing components in the exhaust gas is interrupted. In FIGS. 6C and 6D, the flow rate of the exhaust gas is always lower than the catalytic reaction activation limit K, therefore the action of oxidizing the reducing components in the exhaust gas is continuously performed. In the present invention, when engine warm-up is ended, the catalytic reaction activation limit K is positioned as shown in FIGS. 6C and 6D.

On the other hand, if a catalyst having exactly the same dimensions and structure as the second catalyst 22 is used as the first catalyst 20 and the first catalyst 20 is arranged in the pipes of the exhaust manifold in the same way as in the embodiment shown in FIG. 4A, the catalytic reaction activation limit K for the first catalyst 20 becomes as shown in FIGS. 6A and 6B. That is, in this case, the first catalyst 20 becomes a far higher temperature than the second catalyst 22, so the catalytic reaction activation limit K becomes higher in the case shown in FIG. 6A than in the case shown in FIG. 6C and becomes higher in the case shown in FIG. 6B than in the case shown in FIG. 6D.

In this embodiment of the present invention, as shown by FIG. 4A, the volume of the first catalyst 20 is made considerably smaller than the volume of the second catalyst so as to lower the catalytic reaction activation limit K by $\Delta K$, $\Delta K'$ as shown in FIGS. 6A and 6B. That is, if the volume of the first catalyst 20 is made smaller, the contact time of the exhaust gas with respect to the first catalyst 20 becomes shorter. If the contact time of the exhaust gas with the first catalyst 20 becomes shorter, unless the flow rate of the exhaust gas is reduced, there will be no catalytic reaction at the first catalyst 20. Therefore, if the volume of the first catalyst 20 is made small, the catalytic reaction activation limit K falls as shown in FIGS. 6A and 6B.

Figure 7A:
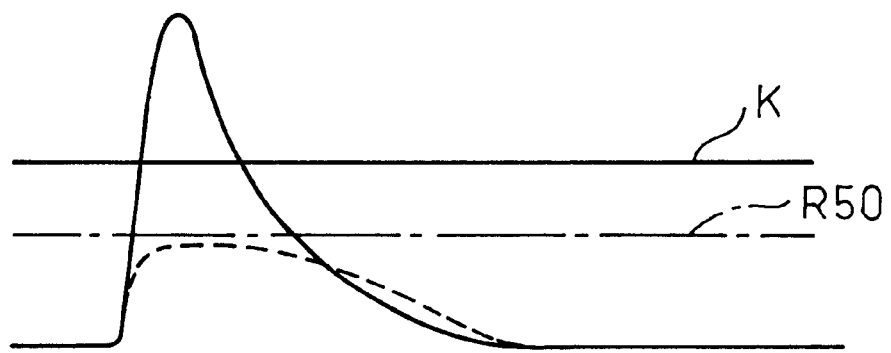
FIGS. 7A and 7B are views of changes in the flow rate of exhaust gas.
Figure 7B:
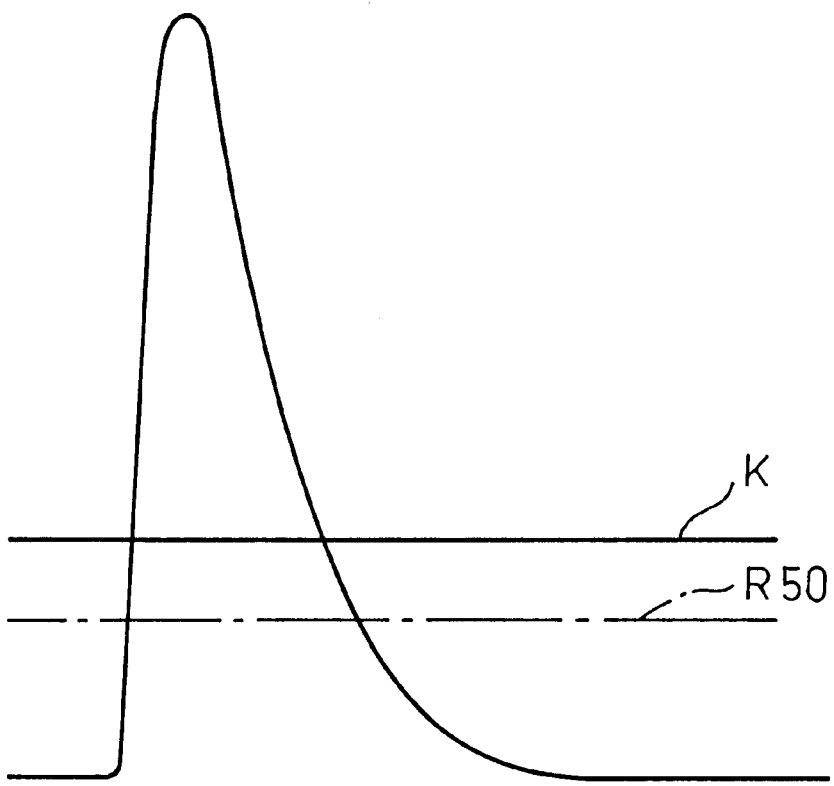

The solid lines in FIGS. 7A and 7B are enlarged views of FIGS. 6A and 6B of the case where the volume of the first catalyst 20 is made considerably smaller than the volume of the second catalyst 22. In this case, as explained above, the catalytic reaction activation limit K falls. Further, FIGS. 7A and 7B show the line where the purification rate of the reducing components in the exhaust gas becomes 50%.

When the flow rate of the exhaust gas exceeds the catalytic reaction activation limit K in FIGS. 7A and 7B, there is no action in oxidizing the reducing components in the exhaust gas, therefore at this time the reducing components in the exhaust gas pass through the first catalyst 20 as they are. On the other hand, when the flow rate of the exhaust gas becomes lower than the catalytic reaction activation limit K, there is an action in oxidizing the reducing components in the exhaust gas. In this case, however, the lower the flow rate of the exhaust gas, the more the action of oxidizing the reducing components in the exhaust gas is promoted and therefore the lower the flow rate of the exhaust gas, the higher the purification rate of the reducing components in the exhaust gas.

If a first catalyst 20 having a considerably smaller volume than the second catalyst 22 is arranged in the pipes of the exhaust manifold 19 as shown in FIG. 4A in this way, a considerable amount of the reducing components in the exhaust gas will pass through the first catalyst 20 as it is, therefore a considerable amount of reducing components in the exhaust gas will be supplied to the second catalyst 22. Note that as will be understood from a comparison of FIG. 7A and FIG. 7B, the amount of the reducing components passing through the first catalyst 20 as it is is increased in engine heavy load operation shown in FIG. 7B compared with engine low load operation shown in FIG. 7A.

On the other hand, in the first embodiment according to the present invention, the exhaust control valve 24 is substantially fully closed when the purification rate of the reducing components in the exhaust gas by the first catalysts 20 should be made higher. Specifically, in this embodiment according to the present invention, about 95% of the area of the flow channel of the exhaust pipe 23 is closed. At this time, the pressure inside the exhaust manifold 19 and the exhaust pipe 21, that is, the back pressure, becomes about 80 KPa. That is, at this time, the back pressure becomes about 2 times the atmospheric pressure.

If the back pressure becomes about two times the atmospheric pressure in this way, the speed by which the exhaust gas flows out from the inside of the combustion chamber 5 to the inside of the exhaust port 11 falls. Further, if the back pressure becomes about two times the atmospheric pressure, the density of the exhaust gas becomes higher and therefore the flow rate of the exhaust gas flowing inside the exhaust passage also falls. That is, at this time, the flow rate of the exhaust gas passing through the first catalyst 20 becomes lower than the catalytic reaction activation limit K at all times as shown by the broken line in FIG. 7A. Therefore, at this time, the majority of the reducing components in the exhaust gas is oxidized in the first catalyst 20. A small amount of the reducing components passes through the first catalyst 20 to flow into the second catalyst 22.

If the exhaust control valve 24 is fully opened in this way, as shown by the solid line in FIG. 7A, the flow rate of the exhaust gas becomes faster and a considerable amount of reducing components included in the exhaust gas passes through the first catalyst 20 as it is and is fed into the second catalyst 22. If the exhaust control valve 24 is made to substantially fully close, as shown by the broken line in FIG. 7A, a large portion of the reducing components included in the exhaust gas is made to be oxidized by the first catalyst 20.

For a while after the start of engine operation, however, normally the engine is operated at a low load. At this time, the temperature of the second catalyst 22 becomes lower. Therefore, at this time, almost no action of the second catalyst 22 in oxidizing the reducing components in the exhaust gas, that is, the action in purifying the unburned hydrocarbons and carbon monoxide, can be expected. Therefore, in the first embodiment, when the engine is operated at a low load in the period from when the engine starts to be operated to when the second catalyst 22 is activated, the exhaust control valve 24 is made to substantially fully close. At this time, the flow rate of the exhaust gas flowing inside the first catalyst 20 becomes lower as shown by the broken line in FIG. 7A and therefore a considerable amount of unburned hydrocarbons and carbon monoxide included in the exhaust gas is purified in the first catalyst 20.

Next, when the second catalyst 22 is activated, the exhaust control valve 24 is made to fully open. At this time, as will be understood from the solid lines of FIGS. 7A and 7B, a considerable amount of the unburned hydrocarbons and carbon monoxide contained in the exhaust gas passes through the first catalyst 20 as it is and flows into the second catalyst 22. As a result, since a large amount of unburned hydrocarbons and carbon monoxide is made to oxidize in the second catalyst 22, a large amount of heat of oxidation reaction is generated in the second catalyst 22 and therefore the second catalyst 22 is held in the catalytic reaction activation state. The region M surrounded by the dotted and dashed lines in FIG. 5 shows the range which the second catalyst 22 can normally take in the first embodiment of the present invention, that is, the region of use of the second catalyst 22.

In this way, in the first embodiment of the present invention, if the second catalyst 22 is once activated, the second catalyst 22 is held in the normal region M, that is, in the catalytic reaction activation region I. Sometimes, however, the second catalyst 22 enters the catalytic reaction deactivation region II due to the engine decelerating or operating at a low load continuously for more than a certain time or another factor. In this embodiment of the present invention, in this case, the exhaust control valve 24 is made to substantially fully close and the unburned hydrocarbons and carbon monoxide in the exhaust gas are made to be oxidized by the first catalyst 20 until the second catalyst 22 again enters the catalytic reaction activation region I.

Figure 8:
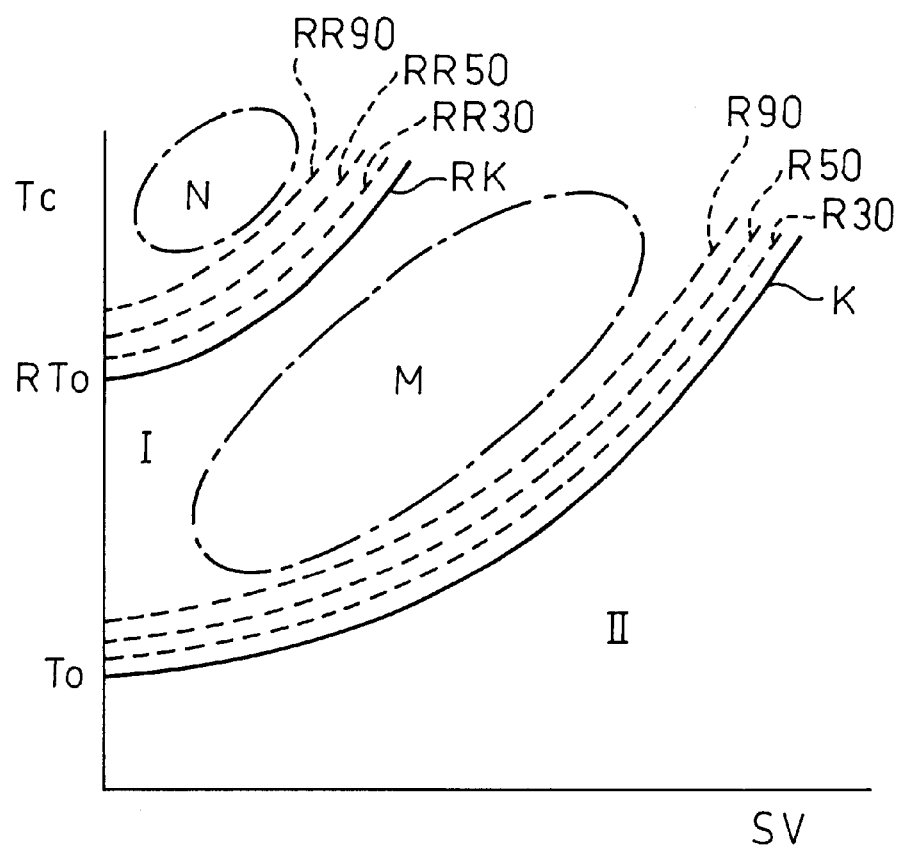
FIG. 8 is a view of a catalytic reaction activation region.

Next, a second embodiment of the present invention will be explained with reference to FIG. 8. In FIG. 8, $T_0$, K, and M are the same as the $T_0$, K, and M shown in FIG. 5 and respectively indicate the activation temperature, the catalytic reaction activation limit, and the normal region of use of the second catalyst 22. As opposed to this, $RT_0$, RK, and N in FIG. 8 respectively indicate the activation temperature, the catalytic reaction activation limit, and region of use of the first catalyst 20 shown in FIGS. 4A, 4B, and 4C. Further, the RR30, RR50, and RR90 in FIG. 8 show the cases of 30%, 50%, and 90% purification rates of the reducing components in the exhaust gas by the first catalysts 20.

That is, as will be understood from FIG. 8, in the second embodiment of the present invention, as the first catalyst 20, use is made of a catalyst having a higher activation temperature $RT_0$ than the second catalyst 22. As shown in FIG. 8, the temperature Tc of the first catalyst 20 at the catalytic reaction activation limit RK of the first catalyst 20 becomes higher the greater the space velocity SV of the exhaust gas flowing inside the first catalyst 20. Further, in the second embodiment, the catalytic reaction activation limit RK of the first catalyst 20 is, compared with the normal use region M of the second catalyst 22, positioned at the higher temperature side in terms of the catalyst temperature Tc and at the lower space velocity side in terms of the space velocity SV.

In the second embodiment, when the reducing components in the exhaust gas are mainly to be oxidized in the first catalyst 20, the space velocity SV of the exhaust gas flowing in the first catalyst 20 is made lower and the temperature Tc of the first catalyst 20 is made to rise so that the first catalyst 20 enters the use region N shown in FIG. 8. Giving a specific example, when the engine is operating at a low load with a low space velocity SV, auxiliary fuel is additionally injected into the combustion chamber 5, whereby the temperature of the exhaust gas exhausted from the combustion chamber 5 is raised and the first catalyst 20 is held in the use region N shown in FIG. 8.

Figure 9:
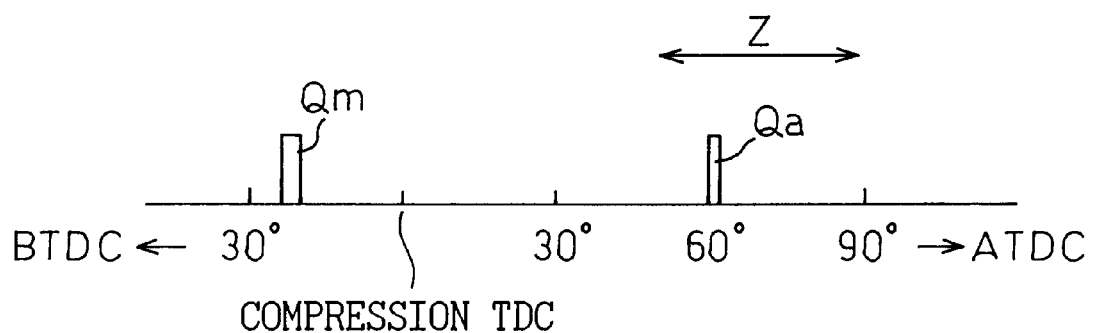
FIG. 9 is a view of an injection timing.

When making the temperature Tc of the first catalyst 20 rise by additionally injecting auxiliary fuel in this way, as shown in FIG. 9, in addition to the injection of the main fuel Qm for generating the engine output, auxiliary fuel Qa is additionally injected during the expansion stroke, in the example shown in FIG. 9, near 60° after top dead center of the compression stroke (ATDC). Note that in this case, after the main fuel Qm is burned, the main fuel Qm is made to be burned under an excess of air so that sufficient oxygen for completely making the auxiliary fuel Qa burn remains in the combustion chamber 5. If making the auxiliary fuel Qa burn in the combustion chamber 5 in this way, in addition to the heat generated by the burning of the main fuel Qm and the auxiliary fuel Qa themselves, the heat of combustion of the unburned hydrocarbons remaining after burning of the main fuel Qm additionally occurs, so the temperature of the burned gas in the combustion chamber 5 becomes considerably high. As a result, the temperature of the exhaust gas exhausted from the combustion chamber 5 becomes high and therefore the first catalyst 20 is held in the catalytic reaction activation region I.

Note that, in the stratified combustion type internal combustion engine shown in FIG. 2, injection timing at which the auxiliary fuel Qa injected can be made to burn well in the combustion chamber 5 is the expansion stroke of from about 50° to about 90° after top dead center of the compression stroke (ATDC) shown by the arrow Z in FIG. 9, therefore in the stratified combustion type internal combustion engine shown in FIG. 2, the auxiliary fuel Qa has to be injected in the expansion stroke from about 50° to 90° after top dead center of the compression stroke (ATDC).

Further, as the method for causing the temperature of the exhaust gas exhausted from the combustion chamber 5 to rise, there are various methods in addition to additionally injecting auxiliary fuel. For example, it is possible to make the temperature of the exhaust gas rise by delaying the injection timing of the main injection by a considerable amount or changing the opening or closing timing of the intake valve 8 or exhaust valve 10.

On the other hand, in the second embodiment, when mainly making the reducing components in the exhaust gas oxidize in the second catalyst 22, the action of raising the temperature of the exhaust gas, in the specific example explained above, the action of additionally injecting auxiliary fuel, is stopped. If the action of raising the temperature of the exhaust gas is stopped, the first catalyst 20 enters the region lower than the catalytic reaction deactivation limit RK in FIG. 8, so the first catalyst 20 no longer acts to oxidize the reducing components in the exhaust gas. Therefore, at this time, the reducing components in the exhaust gas pass through the first catalyst 20 as they are and are made to oxidize at the second catalyst 22. Therefore, it is possible to hold the second catalyst 22 in the catalytic reaction activation region I.

Note that in the second embodiment as well, the action of raising the temperature of the exhaust gas is performed in the period after engine start-up until the second catalyst 22 is activated and when the second catalyst 22 enters the catalytic reaction deactivation region II after activation of the second catalyst 22.

On the other hand, it is possible to keep the first catalyst 20 in the use region N shown in FIG. 8 by substantially fully closing the exhaust control valve 24 without the action of raising the temperature of the exhaust gas. That is, if the exhaust control valve 24 is made to substantially fully close, the space velocity SV of the exhaust gas flowing in the first catalyst 20 becomes lower. Further, if the exhaust control valve 24 is substantially fully closed and the back pressure rises, the pressure of the exhaust gas will not fall that much when the exhaust gas is exhausted from the combustion chamber 5 to the exhaust port 11, therefore the temperature of the exhaust gas will also not fall that much. Accordingly, the temperature of the exhaust gas will rise and as a result the first catalyst 20 will be maintained in the use region N.

Note that when additionally injecting the auxiliary fuel or substantially fully closing the exhaust control valve 24 so as to make the temperature of the exhaust gas rise, even if the temperature of the exhaust gas does not rise to the temperature Tc of the catalyst in the use region N, so long as the temperature Tc of the first catalyst 20 becomes higher than the catalytic reaction activation limit RK, it is possible to hold the first catalyst 20 in the use region N.

That is, if the temperature Tc of the first catalyst 20 becomes higher than the catalytic reaction activation limit RK, the first catalyst 20 acts to oxidize the reducing components in the exhaust gas. If it acts to oxidize them, the temperature Tc of the first catalyst 20 rises due to the heat of the oxidation reaction. If the temperature Tc of the first catalyst 20 rises, the oxidation reaction becomes more intensive. As a result, the temperature Tc of the first catalyst 20 rises and in the end the first catalyst 20 is held in the use region N.

There are various catalysts with a high activation temperature. Therefore, these catalysts can be used as the first catalyst 20. In this case, it is also possible to modify the second catalyst 22 so that the activation temperature becomes higher and use the second catalyst 22 as the first catalyst 20. For example, if making the amount of the metal catalyst carried in the first catalyst 20 lower than the second catalyst 22, the activity of the first catalyst 20 becomes lower than the activity of the second catalyst 22, therefore the activation temperature of the first catalyst 20 becomes higher than that of the second catalyst 22.

On the other hand, even if the amount of the metal carried is the same, if the particle size of the metal catalyst carried in the first catalyst 20 is made larger, the activity of the first catalyst 20 becomes lower than the activity of the second catalyst 22 and therefore in this case as well the activation temperature of the first catalyst 20 becomes higher than that of the second catalyst 20. Further, when the second catalyst 20 has a honeycomb structure with a large number of cells extending in the axial direction, if the number of cells of the first catalyst 20 in a unit cross-sectional area is made lower than that of the second catalyst 22, the opportunities for the reducing components in the exhaust gas to contact the metal catalyst fall. As a result, the activity of the first catalyst 20 becomes lower than even the activity of the second catalyst 22 and therefore the activation temperature of the first catalyst 20 becomes higher than that of the second catalyst 20.

Further, it is possible to form a catalyst layer on the inner wall surface of the exhaust manifold 19 and use this catalyst layer to constitute the first catalyst 20. If a catalyst layer is formed on the inner wall surface of the exhaust manifold 19 in this way, there is less of an opportunity for the reducing components in the exhaust gas to contact the metal catalyst. As a result, the activity of the first catalyst 20 becomes lower than the activity of the second catalyst 22 and therefore the activation temperature of the first catalyst 20 becomes higher than that of the second catalyst 22.

Further, if the alumina, perovskite, or other carrier normally used as the carrier of the metal catalyst becomes high in temperature, even if not carrying a metal catalyst, it functions as a catalyst. Therefore, it is possible to use alumina, perovskite, or another carrier not carrying a metal catalyst as the first catalyst 20.

As explained above, when the activation temperature of the first catalyst 20 is made higher than the activation temperature of the second catalyst 22 and the first catalyst 20 is mainly used to make the reducing components in the exhaust gas oxidize, the temperature Tc of the first catalyst 20 has to be made higher than the catalyst reaction activation limit RK. In this case, in this embodiment of the present invention, the exhaust gas is used to make the temperature Tc of the first catalyst 20 rise. Therefore, to make the temperature Tc of the first catalyst 20 rise, it is preferable to make the first catalyst 20 contact the high temperature exhaust gas as much as possible. The temperature of the exhaust gas in the exhaust passage becomes lower the further downstream, therefore from the viewpoint of raising the catalyst temperature Tc, in the embodiments shown from FIGS. 4A to 4C, it is most desirable to arrange the first catalyst 20 in the pipes of the exhaust manifold 19 as shown in FIG. 4A.

As explained up to here, when mainly using the first catalyst 20 to oxidize the reducing components in the exhaust gas, the exhaust control valve 24 is made to substantially fully close or auxiliary fuel is additionally injected etc. to make the temperature of the exhaust gas rise. In this case, needless to say, it is also possible to both make the exhaust control valve 24 substantially fully close and additionally inject auxiliary fuel. If making the exhaust control valve 24 substantially fully close and additionally injecting auxiliary fuel in this way, it is possible to greatly reduce the amount of unburned hydrocarbons exhausted into the outside air.

Figure 10:
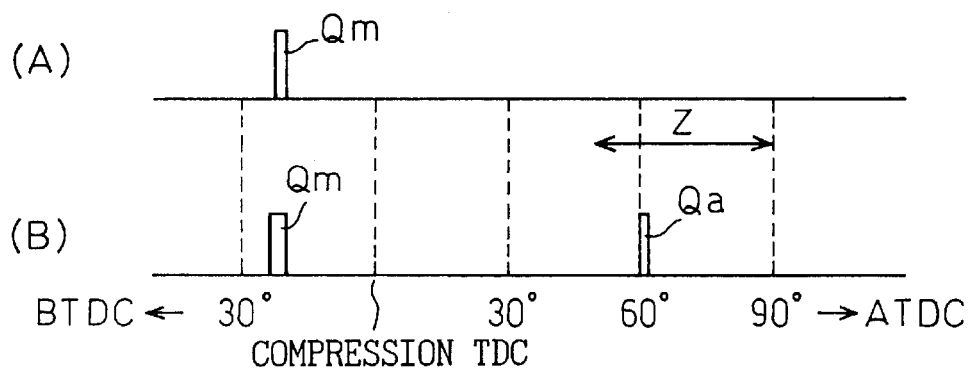
FIG. 10 is a view of an injection timing.

Next, an explanation will be made of an embodiment designed to reduce the unburned hydrocarbons exhausted into the outside air with reference to FIG. 10. Note that in FIG. 10, the abscissa shows the crank angle. BTDC and ATDC indicate before top dead center and after top dead center, respectively.

FIG. 10(A) shows the fuel injection timing in the case when mainly using the second catalyst 22 to make the reducing components in the exhaust gas oxidize and when the required load L is smaller than $L_1$. As shown in FIG. 10(A), at this time, only the main fuel Qm is injected at the end of the compression stroke. At this time, the exhaust control valve 24 is held in the fully opened state.

On the other hand, FIG. 10(B) shows the case when mainly using the first catalyst 20 to make the reducing components in the exhaust gas oxidize. In this case, the exhaust control valve 24 is made to substantially fully close and, in addition to the injection of the main fuel Qm to generate the engine output, auxiliary fuel Qa is additionally injected near 60° after top dead center of the compression stroke (ATDC) during the expansion stroke in the example shown in FIG. 10(B). Note that in this case, the main fuel Qm is made to burn under an excess of air so that sufficient oxygen remains in the combustion chamber 5 to make the auxiliary fuel Qa completely burn after burning the main fuel Qm. Further, FIG. 10(A) and FIG. 10(B) show fuel injection timings in the case of the same engine loads and engine speeds. Therefore, when the engine loads and engine speeds are the same, the amount of injection of the main fuel Qm in the case shown in FIG. 10(B) is increased somewhat compared with the amount of injection of the main fuel Qm in the case shown in FIG. 10(A).

Figure 11:
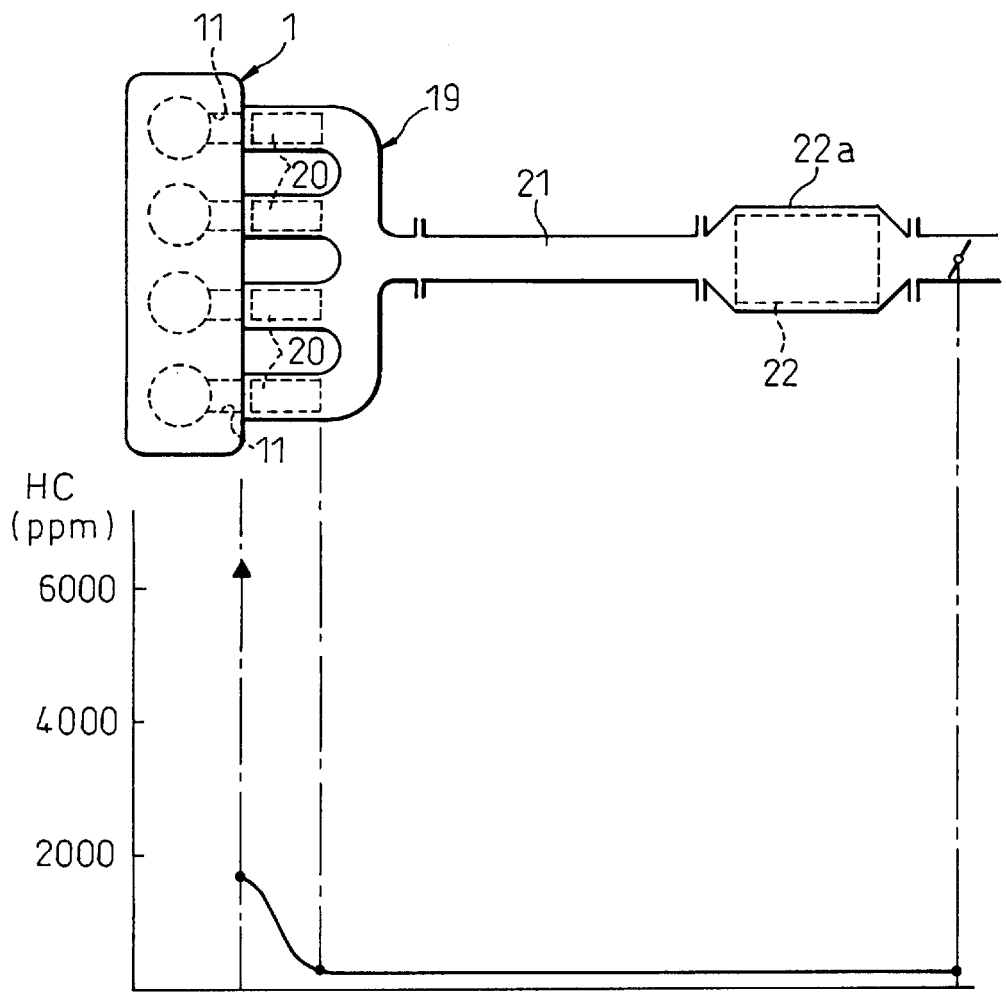
FIG. 11 is a view of the concentration of unburned hydrocarbons.

FIG. 11 shows an example of the concentration (ppm) of the unburned hydrocarbons in the exhaust gas at different positions in the engine exhaust passage when the second catalyst 22 is not activated. In the example shown in FIG. 11, the black triangle shows the concentration (ppm) of unburned hydrocarbons in the exhaust gas at the outlet of the exhaust port 11 in the case of injecting main fuel Qm at the end of the compression stroke as shown in FIG. 10(A) in the state with the exhaust control valve 24 substantially fully closed. In this state, the concentration of the unburned hydrocarbons in the exhaust gas at the outlet of the exhaust port 11 becomes an extremely high value of over 6000 ppm.

On the other hand, the black dots and the solid line in the example shown in FIG. 11 show the concentration (ppm) of unburned hydrocarbons in the exhaust gas when making the exhaust control valve 24 substantially fully close and injecting the main fuel Qm and the auxiliary fuel Qa as shown in FIG. 10(B). In this case, the concentration of the unburned hydrocarbons in the exhaust gas at the outlet of the exhaust port 11 becomes less than 2000 ppm and the concentration of the unburned hydrocarbons in the exhaust gas near the exhaust control valve 24 falls to less than 50 ppm. Therefore, in this case, it is learned that the amount of the unburned hydrocarbons exhausted into the outside air is greatly reduced.

The unburned hydrocarbons are reduced in the exhaust passage upstream of the exhaust control valve 24 in this way because, in addition to the unburned hydrocarbons being made to oxidize at the first catalyst 20, an oxidation reaction of the unburned hydrocarbons is promoted in the exhaust passage downstream of the first catalyst 20. As shown by the black triangle in FIG. 11, however, when the amount of the unburned hydrocarbons at the outlet of the exhaust port 11 is large, however, that is, when the amount of generation of unburned hydrocarbons in the combustion chamber 5 is large, even if making the unburned hydrocarbons oxidize at the first catalyst 20, the amount of unburned hydrocarbons released into the outside air will not become less than 50 ppm. That is, it is possible to greatly reduce the amount of unburned hydrocarbons exhausted into the outside air by making the first catalyst 20 oxidize the unburned hydrocarbons and promoting the oxidation reaction of the unburned hydrocarbons downstream of the first catalyst 20 when, as shown by the black dots in FIG. 11, the concentration of the unburned hydrocarbons at the outlet of the exhaust port 11 is low, that is, when the amount of generation of the unburned hydrocarbons in the combustion chamber 5 is low.

To reduce the amount of unburned hydrocarbons exhausted into the outside air in this way, it is necessary to simultaneously satisfy the two requirements of lowering the amount of generation of unburned hydrocarbons in the combustion chamber 5 and promoting the oxidation reaction of unburned hydrocarbons in the exhaust passage. Therefore, first, an explanation will be given of the second requirement, that is, the promotion of an oxidation reaction of unburned hydrocarbons in the exhaust passage.

When the exhaust control valve 24 is made to substantially fully close, the back pressure rises. Rising of the back pressure means that the pressure of the exhaust gas will not fall that much when the exhaust gas is exhausted from the combustion chamber 5 to the exhaust port 11 and therefore the temperature of the exhaust gas exhausted from the combustion chamber 5 will not fall that much. Therefore, the temperature of the exhaust gas exhausted into the exhaust port 11 is held at a considerably high temperature. On the other hand, a high back pressure means a high density of the exhaust gas. A high density of the exhaust gas means a slow flow rate of the exhaust gas in the exhaust passage from the exhaust port 11 to the exhaust control valve 24. Therefore, the exhaust gas exhausted into the exhaust port 11 remains in the exhaust passage upstream of the exhaust control valve 24 over a long period of time under a high temperature.

If the exhaust gas is made to remain in the exhaust passage upstream of the exhaust control valve 24 over a long period of time under a high temperature in this way, the oxidation reaction of the unburned hydrocarbons in the first catalyst 20 is promoted during that time and further the oxidation reaction of the unburned hydrocarbons in the exhaust passage downstream of the first catalysts 20 is promoted. In this case, experiments by the present inventors have found that to promote an oxidation reaction of unburned hydrocarbons in the exhaust passage downstream of the first catalyst 20, it is necessary to make the temperature of the exhaust gas at the outlet of the exhaust port 11 more than about 750° C., preferably more than 800° C.

Further, the longer the time in which the high temperature exhaust gas remains in the exhaust passage upstream of the exhaust control valve 24, the greater the reduction in the amount of the unburned hydrocarbons. This time becomes longer the further the position of the exhaust control valve 24 from the outlet of the exhaust port 11, therefore the exhaust control valve 24 has to be arranged at a distance from the outlet of the exhaust port 11 required for sufficiently reducing the unburned hydrocarbons. If the exhaust control valve 24 is arranged at a distance from the outlet of the exhaust port 11 sufficient for reducing the unburned hydrocarbons, the concentration of the unburned hydrocarbons is greatly reduced as shown by the solid line in FIG. 11. Note that experiments by the present inventors have found that the distance from the outlet of the exhaust port 11 to the exhaust control valve 24 should be at least 30 cm in order to sufficiently reduce the unburned hydrocarbons.

To promote the oxidation reaction of the unburned hydrocarbons in the exhaust passage downstream of the first catalysts 20 in this way, however, it is necessary to make the temperature of the exhaust gas at the outlet of the exhaust port 11 more than about 750° C., preferably more than 800° C. Further, to reduce the amount of unburned hydrocarbons exhausted into the outside air, it is necessary to satisfy the first requirement explained above. That is, it is necessary to reduce the amount of generation of unburned hydrocarbons in the combustion chamber 5. Therefore, in this embodiment, in addition to the main fuel Qm for generating the engine output, auxiliary fuel Qa is additionally injected after injection of the main fuel Qm to make the auxiliary fuel Qa burn in the combustion chamber 5.

That is, if the auxiliary fuel Qa is made to burned in the combustion chamber 5, a large amount of hydrocarbons remaining after burning of the main fuel Qm is made to burn when burning the auxiliary fuel Qa. Further, the auxiliary fuel Qa is injected into the high temperature gas, so the auxiliary fuel Qa is made to burn well and therefore not that much unburned hydrocarbons remaining after burning of the auxiliary fuel Qa is generated. Therefore, the amount of unburned hydrocarbons finally generated in the combustion chamber 5 becomes considerably small.

Further, if the auxiliary fuel Qa is made to burn in the combustion chamber 5, as explained earlier, in addition to the heat generated by the main fuel Qm and the auxiliary fuel Qa themselves, since the heat of combustion of the unburned hydrocarbons remaining after burning the main fuel Qm is additionally generated, the temperature of the burned gas in the combustion chamber 5 becomes considerably high. By additionally injecting the auxiliary fuel Qa and burning the auxiliary fuel Qa in addition to the main fuel Qm in this way, it is possible to reduce the amount of hydrocarbons generated in the combustion chamber 5 and make the temperature of the exhaust gas at the outlet of the exhaust port 11 more than 750° C., preferably more than 800° C.

In this way, in this embodiment, it is necessary to make the auxiliary fuel Qa burn in the combustion chamber 5. Therefore, it is necessary that sufficient oxygen remain in the combustion chamber 5 at the time of burning the auxiliary fuel Qa. Further, it is necessary to inject the auxiliary fuel Qa at a timing at which the injected auxiliary fuel Qa would be burned well in the combustion chamber 5.

Therefore, in this embodiment, the main fuel Qm is made to burn under an excess of air so that sufficient oxygen remains in the combustion chamber 5 at the time of combustion of the auxiliary fuel Qa. Further, the injection timing for making the auxiliary fuel Qa injected in the stratified combustion type internal combustion engine shown in FIG. 2 burn well in the combustion chamber 5 is, as explained above, the expansion stroke from about 50° to about 90° after top dead center of the compression stroke (ATDC) shown by the arrow Z in FIG. 10. Therefore, in the stratified combustion type internal combustion engine shown in FIG. 2, the auxiliary fuel Qa is injected in the expansion stroke from about 50° to about 90° after top dead center of the compression stroke (ATDC). Note that the auxiliary fuel Qa injected in the expansion stroke from about 50° to about 90° after top dead center of the compression stroke (ATDC) does not contribute much at all to the generation of output of the engine.

According to experiments of the present inventors, however, in the stratified combustion type internal combustion engine shown in FIG. 2, when the auxiliary fuel Qa is injected near 60° after top dead center of the compression stroke (ATDC), the amount of unburned hydrocarbons exhausted into the outside air becomes the least. Therefore, in this embodiment, as shown in FIG. 10(B), the timing of injection of the auxiliary fuel Qa is made near 60° after top dead center of the compression stroke (ATDC).

The optimal injection timing of the auxiliary fuel Qa differs according to the type of the engine. For example, in a diesel engine, the optimal injection timing of the auxiliary fuel Qa is during the expansion stroke or the exhaust stroke. Therefore, in the present invention, the auxiliary fuel Qa is injected during the expansion stroke or the exhaust stroke.

On the other hand, the temperature of the burned gas in the combustion chamber 5 is affected by both of the heat of combustion of the main fuel Qm and the heat of combustion of the auxiliary fuel Qa. That is, the temperature of the burned gas in the combustion chamber 5 becomes higher the more the amount of injection of the main fuel Qm is increased and becomes higher the more the amount of injection of the auxiliary fuel Qa is increased. Further, the temperature of the burned gas in the combustion chamber 5 is affected by the back pressure. That is, the higher the back pressure, the more difficult the flow of the unburned gas from the combustion chamber 5, so the greater the amount of the burned gas remaining in the combustion chamber 5 and therefore if the exhaust control valve 24 is made to substantially fully close, the temperature of the burned gas in the combustion chamber 5 is made to rise.

If however the exhaust control valve 24 is made to substantially close and thereby the back pressure rises, the torque generated by the engine falls with respect to the optimum required torque. Therefore, in this embodiment, when the exhaust control valve 24 is made to substantially fully close as shown in FIG. 10(B), the amount of injection of the main fuel Qm is made to increase compared with the case where the exhaust control valve 24 is made to fully open under the same engine operating conditions so as to approach the required torque of the engine when making the exhaust control valve 24 fully open under the same engine operating conditions as shown in FIG. 10(A). Note that in this embodiment, when the exhaust control valve 24 is made to substantially fully close, the main fuel Qm is increased so that the torque generated by the engine at that time matches with the required torque of the engine when the exhaust control valve 24 is made to fully open under the same engine operating conditions.

Figure 12:
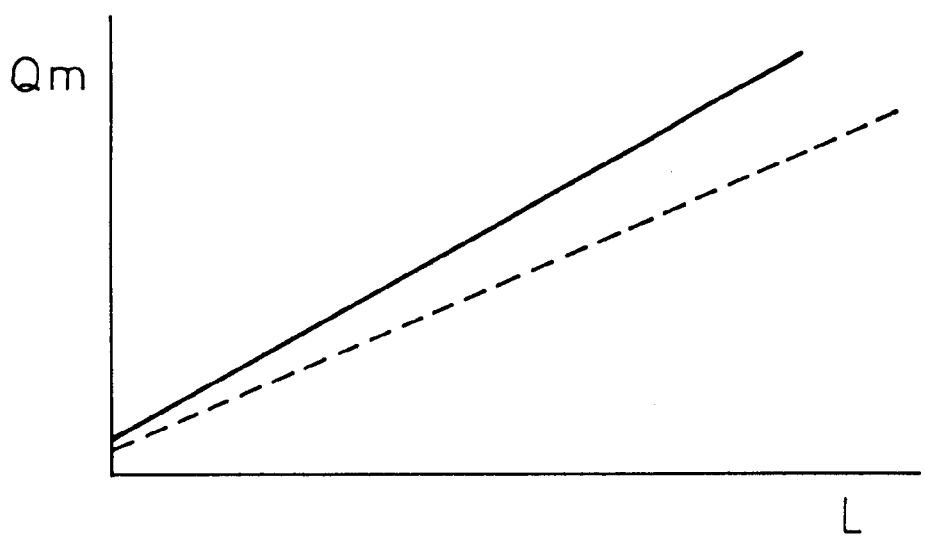
FIG. 12 is a view of an amount of injection of main fuel.

FIG. 12 shows the changes in the main fuel Qm required for obtaining the required torque of the engine with respect to the required load L. Note that in FIG. 12, the solid line shows the case where the exhaust control valve 24 is substantially fully closed, while the broken line shows the case where the exhaust control valve 24 is made to fully open.

Figure 13:
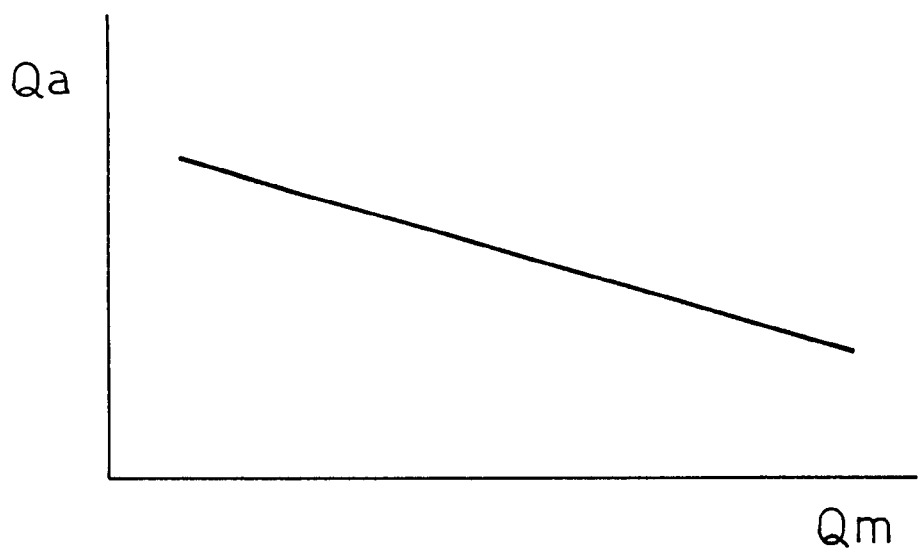
FIG. 13 is a view of the relation between the amount of injection of main fuel and the amount of injection of auxiliary fuel.

On the other hand, FIG. 13 shows the relation between the main fuel Qm and auxiliary fuel Qa required for making the temperature of the exhaust gas at the outlet of the exhaust port 11 from about 750° C. to about 800° C. in the case where the exhaust control valve 24 is made to substantially fully close. As mentioned above, even if the main fuel Qm is increased, the temperature of the unburned gas in the combustion chamber 5 becomes high, while even if the auxiliary fuel Qa is increased, the temperature of the unburned gas in the combustion chamber 5 becomes high. Therefore, the relation between the main fuel Qm and auxiliary fuel Qa required for making the temperature of the exhaust gas at the outlet of the exhaust port 11 from about 750° C. to about 800° C. becomes a relation, as shown in FIG. 13, where if the main fuel Qm is increased, the auxiliary fuel Qa is decreased and if the main fuel Qm is decreased, the auxiliary fuel Qa is increased.

When increasing the main fuel Qm and the auxiliary fuel Qa by the same amount, however, the amount of rise of temperature in the combustion chamber 5 becomes far greater when increasing the auxiliary fuel Qa than when increasing the main fuel Qm. Therefore, from the viewpoint of reduction of the amount of fuel consumption, it can be said to be preferable to make the temperature of the burned gas in the combustion chamber 5 rise by making the auxiliary fuel Qa increase.

Therefore, in this embodiment, when the exhaust control valve 24 is made to substantially fully close, the main fuel Qm is increased by exactly the amount necessary to make the torque generated by the engine rise to the required torque and the temperature of the burned gas in the combustion chamber 5 is made to rise by the heat of combustion of the auxiliary fuel Qa.

If the exhaust control valve 24 is made to substantially fully close and the amount of auxiliary fuel Qa required for making the exhaust gas at the outlet of the exhaust port 11 more than about 750° C., preferably more than about 800° C., is injected, the concentration of the unburned hydrocarbons in the exhaust passage from the exhaust port 11 to the exhaust control valve 24 can be greatly reduced. At this time, in order to reduce the concentration of the unburned hydrocarbons in the exhaust passage from the exhaust port 11 to the exhaust control valve 24, as shown in FIG. 11, to less than 50 ppm, the pressure in the exhaust passage upstream of the exhaust control valve 24 must be made at least about 80 KPa (gauge pressure). The percent of closure of the sectional area of the exhaust passage by the exhaust control valve 24 at this time is at least about 95%. Therefore, in this embodiment, when the amount of emission of unburned gas into the atmosphere should be greatly reduced, the opening degree of the exhaust control valve 24 is feedback controlled based on the output signal of the pressure sensor 33 so that the back pressure becomes about 80 KPa.

In this embodiment, the exhaust control valve 24 is made to substantially fully close and the auxiliary fuel Qa is additionally injected until the second catalyst 22 is activated after engine start-up and when the second catalyst 22 once is activated, then for example low load operation continues for more than a certain time and the second catalyst 22 becomes deactive in state.

Figure 14:
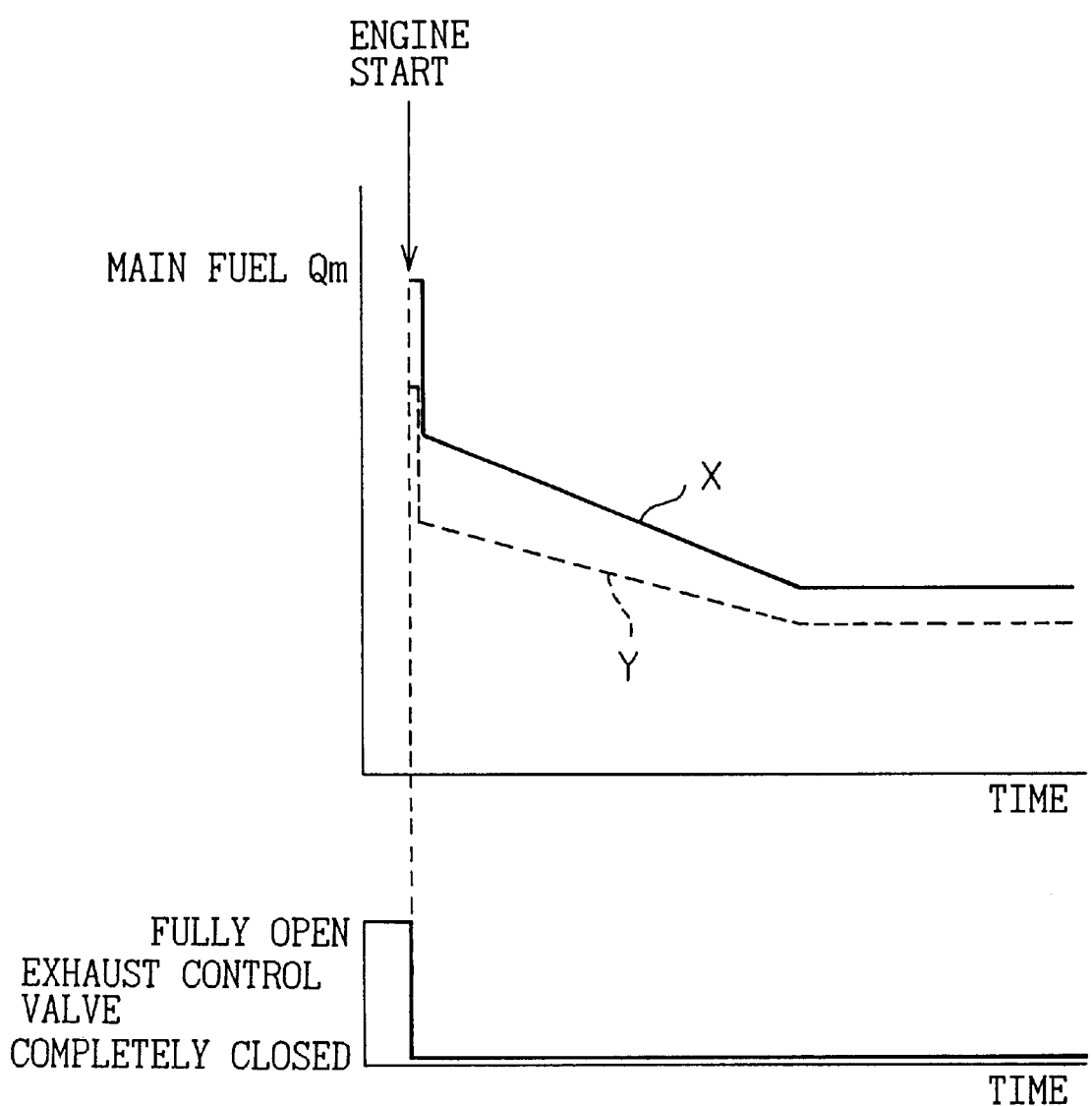
FIG. 14 is a view of the amount of injection of main fuel and the opening degree of an exhaust control valve.

FIG. 14 shows an example of the change of the main fuel Qm and the opening degree of the exhaust control valve 24 in the period after engine start-up until the second catalyst 22 is activated. Note that in FIG. 14, the solid line X shows the optimal amount of injection of the main fuel Qm when the exhaust control valve 24 is substantially fully closed, while the broken line Y shows the optimal amount of injection of the main fuel Qm when the exhaust control valve 24 is fully opened. As will be understood from FIG. 14, at engine start-up and warm-up operation, the exhaust control valve 24 is made to substantially fully close, the amount of injection X of the main fuel Qm is made to increase from the optimum amount of injection Y of the main fuel Qm when the exhaust control valve 24 is made to fully open under the same engine operating state, and the auxiliary fuel Qa is additionally injected.

Figure 15:
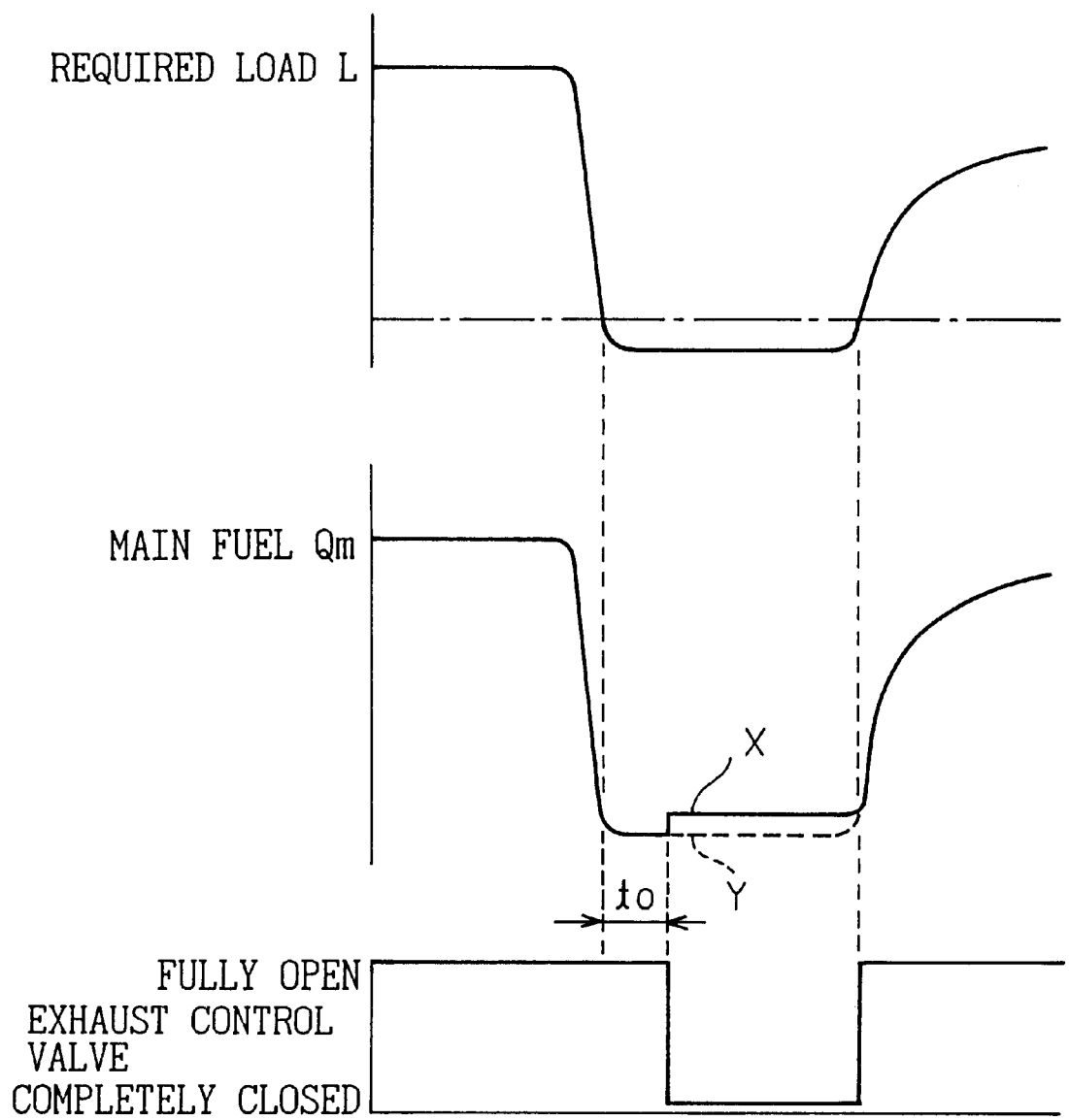
FIG. 15 is a view of the amount of injection of main fuel and the opening degree of the exhaust control valve.

FIG. 15 shows an example of the change of the main fuel Qm and the opening degree of the exhaust control valve 24 when the engine is operating under a low load. Note that in FIG. 15, the solid line X shows the optimal amount of injection of the main fuel Qm when the exhaust control valve 24 is substantially fully closed, while the broken line Y shows the optimal amount of injection of the main fuel Qm when the exhaust control valve 24 is fully opened. As will be understood from FIG. 15, when the engine low load operation continues for over a certain time $t_0$, the exhaust control valve 24 is made to substantially fully close, the amount of injection X of the main fuel Qm is made to increase from the optimum amount of injection Y of the main fuel Qm when the exhaust control valve 24 is made to fully open under the same engine operating state, and the auxiliary fuel Qa is additionally injected.

As explained above, in this embodiment of the present invention, when the reducing components in the exhaust gas should be oxidized mainly in the first catalyst 20, the exhaust control valve 24 is made to substantially fully close, auxiliary fuel is additionally injected etc. to make the exhaust gas rise in temperature, or the exhaust control valve 24 is made to substantially fully close and auxiliary fuel is additionally injected. etc. to make the temperature of the exhaust gas rise.

Figure 16B:
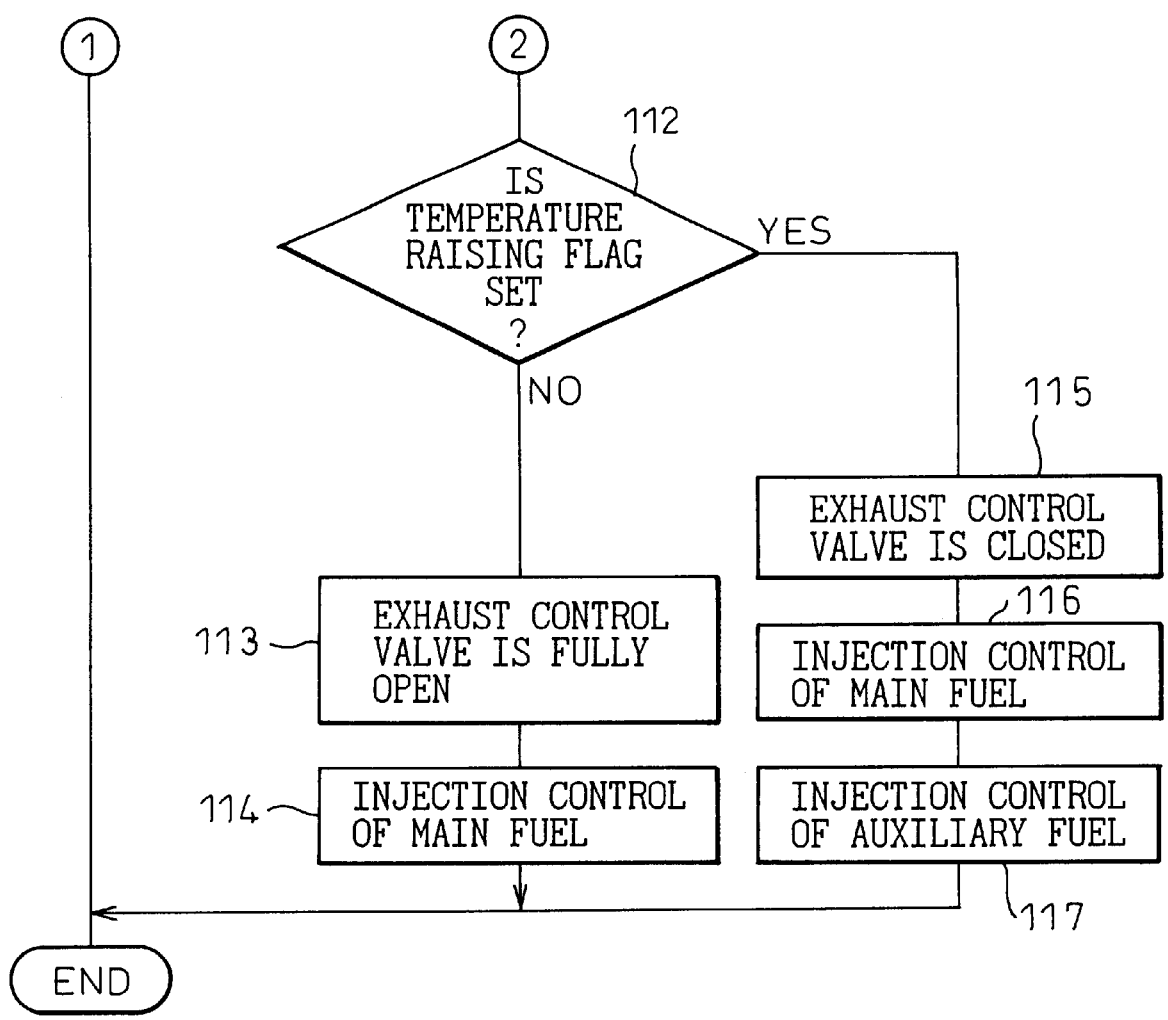

FIGS. 16A and 16B show as a typical example the operational control routine when the exhaust control valve 24 is made substantially fully closed and the auxiliary fuel is additionally injected when the reducing components in the exhaust gas should be oxidized at the first catalyst 20 and downstream of the same.

Referring to FIGS. 16A and 16B, first, at step 100, it is judged if the warm-up completion flag showing that the second catalyst 22 has been activated has been set. When the warm-up completion flag has not been set, that is, when the second catalyst 22 is not activated, the routine proceeds to step 101, where the exhaust control valve 24 is made to substantially fully close. At this time, the opening degree of the exhaust control valve 24 is feedback controlled based on the output signal of the pressure sensor 33 so that the back pressure becomes 80 KPa. Next, at step 102, the amount of injection of the main fuel Qm is controlled to become x shown in FIG. 14. Next, at step 103, the injection of the auxiliary fuel Qa is controlled. Next, at step 104, it is judged based on the output signal of the temperature sensor 34 if the temperature Tc of the second catalyst 22 has exceeded the activation temperature $T_2$, for example, 250° C. When Tc>$T_2$, the routine proceeds to step 105, where the warm-up completion flag is set.

If the warm-up completion flag is set, that is, if the second catalyst 22 is activated, the routine proceeds from step 100 to step 106, where it is judged if the temperature raising flag, set when the first catalyst 22 should be raised in temperature, has been set. When the temperature raising flag has not been set, the routine proceeds to step 107, where it is judged if the elapsed time ti from when the engine load became less than a predetermined load, that is, the low load operating state, has exceeded a predetermined constant time t0, for example, 120 seconds. When ti>$t_0$, it is judged that the second catalyst 22 has entered a deactivated state. At this time, the routine proceeds to step 109, where the temperature raising flag is set. Next, the routine proceeds to step 112.

As opposed to this, when the engine is not operating under a low load or when it is operating under a low load but ti≦$t_0$, the routine proceeds to step 108, where it is judged if the temperature Tc of the second catalyst 22 is lower than deactivation temperature $T_1$ where the catalyst loses its activity, for example, 200° C., and the engine speed N is lower than a predetermined speed N1, for example, 900 rpm. When tc≧$T_1$ or N≧N1, the routine jumps to step 112, while when tc<$T_1$ and N<N1, the routine proceeds to step 109, where the temperature raising flag is set. Next, the routine proceeds to step 112.

If the temperature raising flag is set, the routine proceeds from step 106 to step 110, where it is judged if the temperature Tc of the second catalyst 22 has become higher than the activation temperature $T_2$, for example, 250° C. or the engine speed N has become higher than a predetermined speed N2, for example, 1000 rpm. When Tc≦$T_2$ and N≦N2, the routine jumps to step 112. As opposed to this, when Tc>$T_2$ or N>N2, the routine proceeds to step 111, where the temperature raising flag is reset, then the routine proceeds to step 112.

At step 112, it is judged if the temperature raising flag has been set. When the temperature raising flag has not been set, the routine proceeds to step 113, where the exhaust control valve 24 is made to fully open, then the routine proceeds to step 114, where the injection of the main fuel Qm is controlled. At this time, auxiliary fuel Qa is not injected. As opposed to this, when the temperature raising flag has been set, the routine proceeds to step 115, where the exhaust control valve 24 is made to substantially fully close. At this time, the opening degree of the exhaust control valve 24 is feedback controlled based on the output signal of the pressure sensor 33 so that the back pressure becomes 80 KPa. Next, at step 116, the amount of injection of the main fuel Qm is controlled to become X as shown in FIG. 15. Next, at step 117, the injection of the auxiliary fuel Qa is controlled.

According to the present invention, as explained above, it is possible to make a large amount of reducing components be oxidized by the first catalyst when a large amount of reducing components in an exhaust gas should be oxidized by the first catalyst and to cut down on the reducing components made to be oxidized by the first catalyst so as to send the necessary amount of reducing components to the second catalyst when the second catalyst requires a large amount of reducing components.

While the invention has been described by reference to specific embodiments chosen for purposes of illustration, it should be apparent that numerous modifications could be made thereto by those skilled in the art without departing from the basic concept and scope of the invention.

What is claimed is:

1. An exhaust purification device of an engine having an exhaust passage, comprising:
   a first catalyst arranged in the exhaust passage;
   a second catalyst arranged in the exhaust passage downstream of the first catalyst;
   judging means for judging if the engine is in an operating state where reducing components in an exhaust gas should mainly be made to oxidize by the first catalyst or if the engine is in an operating state where reducing components in the exhaust gas should mainly be made to oxidize by the second catalyst; and
   oxidation ratio controlling means for making a ratio of oxidation of reducing components in the exhaust gas at the first catalyst increase when it is judged that the engine is in an operating state where reducing components in the exhaust gas should mainly be made to oxidize by the first catalyst and for making the ratio of oxidation of reducing components in the exhaust gas at the first catalyst decrease when it is judged that the engine is in an operating state where reducing components in the exhaust gas should mainly be made to oxidize by the second catalyst;
   said judging means judging that the engine is operating in a state where the reducing components in the exhaust gas should mainly be made to oxidize by the first catalyst until when the second catalyst is activated after the engine is started.

2. An exhaust purification device of an engine as set forth in claim 1, wherein the exhaust passage is comprised of a plurality of exhaust branch pipes connected to corresponding engine cylinders and a common exhaust passage connected to the exhaust branch pipes, the first catalyst is arranged in each of the exhaust branch pipes, and the second catalyst is arranged in the common exhaust passage.

3. An exhaust purification device of an engine as set forth in claim 1, wherein engine cylinders are divided into at least one pair of groups of cylinders, the exhaust passage is comprised of exhaust common branch pipes provided for each cylinder group and common to each cylinder group and a common exhaust passage connected to these common exhaust branch pipes, the first catalyst is provided in the common exhaust branch pipes, and the second catalyst is arranged in the common exhaust passage.

4. An exhaust purification device of an engine as set forth in claim 1, wherein the exhaust passage has a common exhaust passage common for all engine cylinders and the first catalyst and second catalyst are arranged in the common exhaust passage.

5. An exhaust purification device of an engine as set forth in claim 1, wherein said oxidation ratio controlling means makes a back pressure in the exhaust passage rise when it is judged that the engine is in an operating state where the reducing components in the exhaust gas should be made to mainly be oxidized by the first catalyst.

6. An exhaust purification device of an engine as set forth in claim 5, wherein an exhaust control valve is arranged in the exhaust passage downstream of the second catalyst and said oxidation ratio controlling means makes the back pressure in the exhaust passage rise by substantially fully closing the exhaust control valve.

7. An exhaust purification device of an engine as set forth in claim 5, wherein said oxidation ratio controlling means makes a back pressure in the exhaust passage rise and makes a temperature of exhaust gas exhausted from the engine rise when it is judged that the engine is operating in a state where the reducing components in the exhaust gas should be mainly made to oxidize by the first catalyst.

8. An exhaust purification device of an engine as set forth in claim 7, wherein, in addition to making a main fuel, injected into a combustion chamber for generating engine output, burn under an excess of air, auxiliary fuel is additionally injected into the combustion chamber at a predetermined timing in an expansion stroke or exhaust stroke where the auxiliary fuel can burn so as to make the temperature of the exhaust gas exhausted from the engine rise.

9. An exhaust purification device of an engine as set forth in claim 1, wherein as the first catalyst, a catalyst with a higher activation temperature than the second catalyst is used and wherein said oxidation ratio controlling means makes at least one of a back pressure in the exhaust passage and temperature of an exhaust gas exhausted from the engine rise when it is judged that the engine is operating in a state where the reducing components in the exhaust gas should be mainly made to oxidize by the first catalyst.

10. An exhaust purification device of an engine as set forth in claim 9, wherein as the first catalyst, use is made of a catalyst which is activated when at least one of the back pressure in the exhaust passage and the temperature of the exhaust gas exhausted from the engine is made to rise by the oxidation ratio controlling means when the engine load is lower than a predetermined load and which is not activated when there is neither an action of raising the back pressure in the exhaust passage nor an action of raising the temperature of the exhaust gas exhausted from the engine by the oxidation ratio controlling means when the engine load is lower than a predetermined load.

11. An exhaust purification device of an engine as set forth in claim 9, wherein an exhaust control valve is arranged in the exhaust passage downstream of the second catalyst and wherein the oxidation ratio controlling means makes the back pressure in the exhaust passage rise by substantially fully closing the exhaust control valve.

12. An exhaust purification device of an engine as set forth in claim 9, wherein, in addition to making a main fuel, injected into a combustion chamber for generating engine output, burn under an excess of air, auxiliary fuel is additionally injected into the combustion chamber at a predetermined timing in an expansion stroke or exhaust stroke where the auxiliary fuel can burn so as to make the temperature of the exhaust gas exhausted from the engine rise.

13. An exhaust purification device of an engine as set forth in claim 1, wherein said judging means judges that the engine is operating in a state where the reducing components in the exhaust gas should mainly be made to oxidize by the first catalyst when it is judged that the second catalyst cannot be maintained in an activated state.

14. An exhaust purification device of an engine as set forth in claim 13, wherein it is judged that the second catalyst cannot be maintained in an activated state when engine low load operation has continued for a predetermined time.

15. An exhaust purification device of an engine as set forth in claim 1, wherein it is judged that the engine is operating in a state where the reducing components in the exhaust gas should be mainly oxidized by the first catalyst when the second catalyst becomes deactivated.

16. An exhaust purification device of an engine as set forth in claim 15, wherein said judging means judges that the engine is operating in a state where the reducing components in the exhaust gas should be mainly oxidized by the first catalyst when the second catalyst becomes deactivated and an engine speed becomes less than a predetermined speed.

17. An exhaust purification device of an engine as set forth in claim 1, wherein the first catalyst is comprised of one of an oxidation catalyst and a three-way catalyst and the second catalyst is comprised of one of an oxidation catalyst, three-way catalyst, and NOx absorbent.

* * * * *